United States Patent

Strehlau et al.

[11] Patent Number: 6,145,303
[45] Date of Patent: Nov. 14, 2000

[54] PROCESS FOR OPERATING AN EXHAUST GAS TREATMENT UNIT CONTAINING A SULFUR TRAP AND A NITROGEN OXIDES STORAGE CATALYST

[75] Inventors: Wolfgang Strehlau, Grosskrotzenburg; Ulrich Göbel, Hattersheim; Egbert Lox, Hanau; Wilfried Müller, Karben; Rainer Domesle, Alzenau, all of Germany

[73] Assignee: Degussa-Hüls Aktiengesellschaft, Frankfurt, Germany

[21] Appl. No.: 09/276,131

[22] Filed: Mar. 25, 1999

[30] Foreign Application Priority Data

Mar. 27, 1998 [DE] Germany .................. 198 13 654

[51] Int. Cl.⁷ .................. F01N 3/00; B01D 47/00
[52] U.S. Cl. .................. 60/274; 423/212
[58] Field of Search .................. 60/274, 247, 285, 60/300; 423/212; 123/568.11; 180/309, 89.2; 181/213

[56] References Cited

U.S. PATENT DOCUMENTS

| | | |
|---|---|---|
| 5,657,625 | 8/1997 | Koga et al. . |
| 5,727,385 | 3/1998 | Hepburn .................. 60/297 |
| 5,832,722 | 11/1998 | Cullen et al. .................. 60/274 |
| 5,974,788 | 11/1999 | Hepburn et al. .................. 60/274 |
| 5,983,627 | 11/1999 | Asik .................. 60/274 |

FOREIGN PATENT DOCUMENTS

| | | |
|---|---|---|
| 0 560 991 B1 | 9/1993 | European Pat. Off. . |
| 0 582 917 A1 | 2/1994 | European Pat. Off. . |
| 0 625 633 A1 | 11/1994 | European Pat. Off. . |
| 0 814 242 | 12/1997 | European Pat. Off. . |
| 195 22 165 | 12/1995 | WIPO . |
| WO 96/05140 | 2/1996 | WIPO . |

*Primary Examiner*—Teresa Walberg
*Assistant Examiner*—Daniel Robinson
*Attorney, Agent, or Firm*—Smith, Gambrell & Russell, LLP

[57] ABSTRACT

A process is disclosed for operating an exhaust gas treatment unit for an internal combustion engine which is operated with lean normalized air/fuel ratios over most of the operating period. The exhaust gas treatment unit contains a nitrogen oxides storage catalyst with an activity window $\Delta T_{NOX}$ for the storage of nitrogen oxides at normalized air/fuel ratios of greater than 1 and release of the nitrogen oxides at normalized air/fuel ratios of less than or equal to 1 and a sulfur trap, located upstream of the nitrogen oxides storage catalyst, with a sulfur desorption temperature $T_{S,DeSOx}$ above which the sulfates stored on the sulfur trap are decomposed at normalized air/fuel ratios of less than or equal to 1. The nitrogen oxides contained in the exhaust gas are stored on the nitrogen oxides storage catalyst and the sulfur oxides are stored on the sulfur trap at normalized air/fuel ratios greater than 1 and exhaust gas temperatures $T_K$ within the activity window $T_{NOX}$, wherein at the same time the exhaust gas temperature just upstream of the sulfur trap is lower than its sulfur desorption temperature $T_{S,DeSOx}$. By cyclic lowering of the normalized air/fuel ratio in the exhaust gas to less than 1 the stored nitrogen oxides are released again from the storage catalyst. After each predetermined number $N_1$ of nitrogen oxides storage cycles, sulfur is removed from the sulfur trap. This takes place by raising the exhaust gas temperature just upstream of the sulfur trap to above its sulfur desorption temperature $T_{S,DeSOx}$ and also lowering the normalized air/fuel ratio in the exhaust gas to less than 1.

25 Claims, 13 Drawing Sheets

PROCESS FOR OPERATING AN EXHAUST GAS TREATMENT UNIT CONTAINING A SULFUR TRAP AND A NITROGEN OXIDES STORAGE CATALYST

INTRODUCTION AND BACKGROUND

The present invention relates to a process for operating an exhaust gas treatment unit for an internal combustion engine which is operated with lean air/fuel ratios over most of the operating period. The exhaust gas treatment unit contains a nitrogen oxides storage catalyst for converting the nitrogen oxides contained in the exhaust gas. To protect the storage catalyst from being poisoned by sulfur oxides, a sulfur trap to store sulfur oxides by producing sulfates is located upstream of the storage catalyst.

Nitrogen oxides catalysts were developed specifically for the exhaust gas treatment of lean-burn internal combustion engines. Lean operated internal petrol engines, so-called lean-burn engines, and diesel engines belong to the class of lean-mix operated engines. Lean-burn engines, in particular engines with direct injection of gasoline, are increasingly used in the construction of vehicles because they enable theoretical savings in fuel of up to 25% as compared with stoichiometrically operated internal combustion engines.

Carbon monoxide, unburnt hydrocarbons (HC), and nitrogen oxides ($NO_x$) are the main harmful substances found in the exhaust gas of internal combustion engines. In addition, the exhaust gas also contains small proportions of hydrogen ($H_2$) and sulfur oxides ($SO_x$) which come from the sulfur content of the fuel and lubricating oil in the engine. A high percentage of the harmful substances, with the exception of sulfur oxides, can be converted into the harmless components water, carbon dioxide and nitrogen by modern exhaust gas catalysts, under stoichiometric operation. The catalysts developed for exhaust gas treatment of stoichiometrically operated internal combustion engines are known as three-way catalysts.

Stoichiometric conditions are present when the normalized air/fuel ratio $\lambda$ is 1. The normalized air/fuel ratio $\lambda$ is the air/fuel ratio normalized to stoichiometric conditions. The air/fuel ratio states how many kilograms of air are required for complete combustion of one kilogram of fuel. With conventional fuels, the stoichiometric air/fuel ratio has a value of 14.6. The air/fuel ratio of the exhaust gas emitted by an internal combustion engine corresponds to the air/fuel ratio of the air/fuel mixture supplied to the internal combustion engine. Exhaust gases with normalized air/fuel ratios of more than 1 are called lean, and exhaust gases with normalized air/fuel ratios of less than 1 are called rich.

Stoichiometric operation is maintained by controlling the air/fuel ratio supplied to the internal combustion engine. The signal from an oxygen sensor, a so-called $\lambda$-sensor, is used for control purposes. Three-way catalysts can simultaneously convert the three harmful substances HC, CO and $NO_x$ in the exhaust gas only within a very narrow normalized air/fuel ratio interval between about 0.97 and about 1.03.

Whereas the purification of exhaust gases from stoichiometrically operated internal combustion engines has achieved a very high level, there are still considerable problems with conversion of nitrogen oxides emissions from lean operated internal combustion engines. During most of the operating period, these internal combustion engines have normalized air/fuel ratios greater than 1.3. The exhaust gas contains about 3 to 15% of oxygen. Thus, the conditions in the exhaust gas are strongly oxidizing. Under these conditions, the nitrogen oxides in the exhaust gas can no longer be reduced in a simple manner. The nitrogen oxides storage catalysts mentioned above, inter alia, have been developed to solve this problem.

The mode of operation and composition of nitrogen oxides storage catalysts are known for example from EP 0 560 991 B1. As storage material, these catalysts contain at least one component from the group of alkali metals (potassium, sodium, lithium, cesium), the alkaline earth metals (barium, calcium) or the rare earth metals (lanthanum, yttrium). The storage catalysts contain platinum as the catalytically active element. Under oxidizing exhaust gas conditions, that is under lean operation, the storage materials can store the nitrogen oxides contained in the exhaust gas in the form of nitrates. However, for this to occur, it is necessary that the nitrogen oxides, which contain about 50 to 90% of nitrogen monoxide depending on the construction of the engine and its mode of operation, are first oxidized to nitrogen dioxide. This takes place on the platinum component of the storage catalyst.

Since the storage capacity of a storage catalyst is restricted, it has to be regenerated from time to time. For this purpose, the normalized air/fuel ratio in the air/fuel mixture which is supplied to the engine, and thus also the normalized air/fuel ratio in the exhaust gas leaving the engine, is lowered to values of less than 1 for short periods. This is also called enriching the air/fuel mixture or exhaust gas. Thus, during these brief operating phases, reducing conditions prevail in the exhaust gas prior to its entrance into the storage catalyst.

Under the reducing conditions during the enrichment phase, the nitrogen oxides stored in the form of nitrates are released again (desorbed) and are reduced to nitrogen on the storage catalyst with simultaneous oxidation of carbon monoxide, hydrocarbons and hydrogen, as on a conventional three-way catalyst.

Despite their huge potential for removing nitrogen oxides from the exhaust gas of lean operated internal combustion engines, nitrogen oxides storage catalysts have not yet been used widely. One substantial problem when using nitrogen oxides storage catalysts is, in fact, the sulfur content of the fuel. This is emitted from internal combustion engines mainly in the form of sulfur dioxide. Sulfur dioxide acts as a catalyst poison in conventional three-way converter catalysts and in particular in nitrogen oxides storage catalysts. Poisoning by sulfur leads to a reduction in the conversion of harmful substances and to more rapid ageing of the catalyst in three-way catalysts. In general, the poisoning of three-way catalysts is largely reversible. The sulfur components in the exhaust gas are present in the form of sulfates on the three-way catalyst. Regeneration of the catalyst takes place under normal driving conditions during driving phases with high exhaust gas temperatures and a reducing exhaust gas. Under these conditions, the sulfates are reduced and the sulfur is emitted in the form of sulfur dioxide or hydrogen sulfide. The emission of hydrogen sulfide can be suppressed by specific measures relating to the catalyst and engine regulation.

Poisoning of a nitrogen oxides storage catalyst by sulfur oxides takes place in principle in the same way as the storage of nitrogen oxides. The sulfur dioxide emitted by the engine is oxidized to sulfur trioxide on the catalytically active noble metal component of the storage catalyst. Sulfur trioxide reacts with the storage materials in the storage catalyst with the formation of the corresponding sulfates. Particularly disadvantageous is the fact that the absorption of sulfur trioxide is preferred over the absorption of nitrogen oxides, and the sulfates which are formed are thermally very stable. Thus, there is a considerable reduction in the nitrogen oxides storage capacity of the catalyst as a result of poisoning by sulfur oxides which, in contrast to the situation in three-way catalysts, is reversible only at high exhaust gas temperatures, due to the high thermal stability of the sulfates of the storage materials, even under reducing exhaust gas conditions.

Strehlau et al (Conference "Motor und Umwelt" Graz, 1997, Proceedings, pages 15–30) found that sulfur can be removed from barium-containing storage catalysts to the optimum with exhaust gas temperatures just upstream of the catalyst of 650° C. and with normalized air/fuel ratios of 0.98. These exhaust gas conditions can be set, even during part-load operation of vehicles by modifying the operating parameters of the engine. Modification of the operating parameters has to be performed in such a way that the least possible change to the torque is caused. Removal of sulfur at high exhaust gas temperatures, however, is associated with a considerable increase in consumption of fuel since the fuel is used simply to heat and condition the nitrogen oxides storage catalyst and is not converted into driving performance.

According to EP 0 582 917 A1, it has been suggested that the poisoning of a storage catalyst with sulfur can be reduced by a sulfur trap inserted into the exhaust gas stream upstream of the storage catalyst. Alkali metals (potassium, sodium, lithium and cesium), alkaline earth metals (barium and calcium) and rare earth metals (lanthanum and yttrium) are suggested as storage materials for the sulfur trap. The sulfur trap also contains platinum as a catalytically active component. However, the disadvantage of the proposals in EP 0 582 917 A1 is that removal of sulfur from the sulfur trap is not provided, that is to say that after reaching the full storage capacity of the sulfur trap, the sulfur oxides contained in the exhaust gas pass unhindered through the sulfur trap and can poison the downstream nitrogen oxides storage catalyst.

EP 0 625 633 A1 makes some improvement to this design. According to this document, a sulfur trap is also located in the exhaust gas stream of the internal combustion engine, just upstream of the nitrogen oxides storage catalyst. This combination of sulfur trap and nitrogen oxides storage catalyst is operated in such a way that sulfur oxides are stored on the sulfur trap and nitrogen oxides are stored on the nitrogen oxides storage catalyst under lean exhaust conditions. By periodically changing the exhaust gas conditions from lean to rich, the sulfates stored on the sulfur trap are decomposed to give sulfur dioxide and the nitrates stored on the nitrogen oxides storage catalyst are decomposed to give nitrogen dioxide. There is a risk here that sulfur dioxide and nitrogen dioxide react with each other over the nitrogen oxides storage catalyst to give sulfur trioxide and nitrogen monoxide and that sulfur trioxide is stored on the nitrogen oxides storage catalyst in the form of sulfates.

According to EP 0 625 633 A1, however, this type of reaction takes place to only a small extent since the rate of decomposition of nitrates is generally substantially higher than the corresponding rate of decomposition of sulfates. The decomposition of nitrates takes place in a short time interval of only about 5 to 20 seconds, while time intervals of up to 10 minutes are required for the complete decomposition of sulfates on the sulfur trap. Thus there is very little overlap of the times of emission of sulfur dioxide and nitrogen dioxide. Poisoning of the nitrogen oxides storage catalyst by sulfur during removal of sulfur from the sulfur trap can be kept low in this way. A further improvement is produced by highly enriching the exhaust gas to release nitrogen oxides from the nitrogen oxides catalyst and only slightly enriching the exhaust gas to release the sulfur oxides from the sulfur trap.

The quantities of sulfur oxides contained in the exhaust gas from an internal combustion engine are much smaller than the quantities of nitrogen oxides. Therefore, it is not necessary to also remove sulfur from the sulfur trap each time the nitrogen oxides are released from the storage catalyst. Whereas the period of the cycle for releasing nitrogen oxides from the nitrogen oxides catalyst is about one minute, the period of the cycle for releasing sulfur oxides from the sulfur trap is several hours, according to EP 0 582 917 A1.

The methods suggested so far for operating an exhaust gas treatment unit consisting of a sulfur trap and a nitrogen oxides storage catalyst have the disadvantage that deliberate poisoning of the nitrogen oxides storage catalyst is sometimes accepted.

An object of the present invention, therefore, is to provide an improved process for operating an exhaust gas treatment unit consisting of a sulfur trap and a nitrogen oxides storage catalyst which largely avoids the disadvantages mentioned above. In addition, there should be only a small increase in fuel consumption associated with using the desired process.

SUMMARY OF THE INVENTION

The above and other objects of the invention can be achieved by a process for operating an exhaust gas treatment unit for an internal combustion engine which is operated during most of the operating period with lean air/fuel ratios, wherein the exhaust gas treatment unit contains:

a nitrogen oxides storage catalyst with an activity window $\Delta T_{NOX}$ between the temperatures $T_{K,1}$ and $T_{K,2}$ for the storage of nitrogen oxides at normalized air/fuel ratios greater than 1 and release of the nitrogen oxides at normalized air/fuel ratios less than or equal to 1 and a sulfur desorption temperature $T_{K,DeSOx}$, above which the sulfates stored on the catalyst are decomposed at normalized air/fuel ratios less than or equal to 1, and a sulfur trap which is upstream of the nitrogen oxides storage catalyst and located at a distance from this, with a sulfur desorption temperature $T_{S,DeSOx}$ above which sulfates stored on the sulfur trap are decomposed at normalized air/fuel ratios less than or equal to 1, wherein there is a temperature difference $\Delta T_{S,K}$ between the sulfur trap and the storage catalyst, between the exhaust gas temperature $T_S$ just upstream of the sulfur trap and the exhaust gas temperature $T_K$ just upstream of the storage catalyst.

The process of the present invention includes the following steps:

a) storage of the nitrogen oxides contained in the exhaust gas on the nitrogen oxides storage catalyst and of the sulfur oxides on the sulfur trap at normalized air/fuel ratios greater than 1 and with exhaust gas temperatures $T_K$ within the activity window $\Delta T_{NOX}$, wherein at the same time the exhaust gas temperature $T_S$ is less than the sulfur desorption temperature $T_{S,DeSOx}$, and cyclic lowering of the normalized air/fuel ratio in the exhaust gas to less than 1 to release the stored nitrogen oxides (conclusion of a storage cycle), b) removal of sulfur from the sulfur trap after each predetermined number $N_1$ of nitrogen oxides storage cycles by raising the exhaust gas temperature $T_S$ above the sulfur desorption temperature $T_{S,DeSOx}$ of the sulfur trap and lowering the normalized air/fuel ratio in the exhaust gas to below 1, and c) cyclic repetition of steps a) and b).

The expression "storage" in the context of this invention is understood to mean both chemical conversion of the components in the exhaust gas being stored by the storage material to give nitrites and nitrates or sulfites and sulfates, and also physical adsorption on the surface of the storage material. The nitrogen oxides storage catalyst is called simply the storage catalyst in the following.

BRIEF DESCRIPTION OF THE DRAWINGS

The present invention will be further understood with reference to the accompanying drawings, wherein.

DETAILED DESCRIPTION OF THE INVENTION

Figure 1:
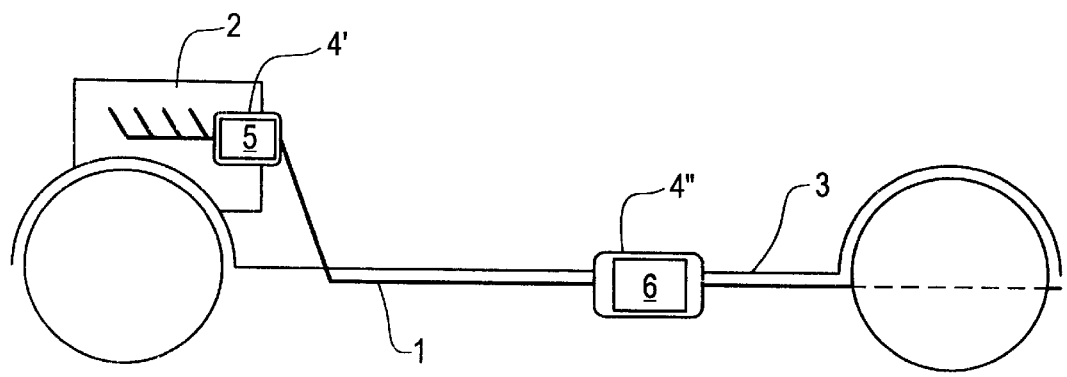
FIG. 1 is a schematic representation of an arrangement for an exhaust gas treatment unit including a sulfur trap and a nitrogen oxides storage catalyst in a vehicle with the sulfur trap located close to the engine and the storage catalyst located under the floor of the vehicle.

FIG. 1 shows a treatment unit (1) for the exhaust gas from an engine (2), that is to say an internal combustion engine. (3) denotes the underfloor region of the vehicle. The exhaust gas treatment unit includes a sulfur trap 5 and a nitrogen oxides storage catalyst 6. The sulfur trap is located directly downstream of the engine exhaust point in its own housing 4'. The storage catalyst 6 is located in housing 4" under the floor (3) of the vehicle.

Figure 2:
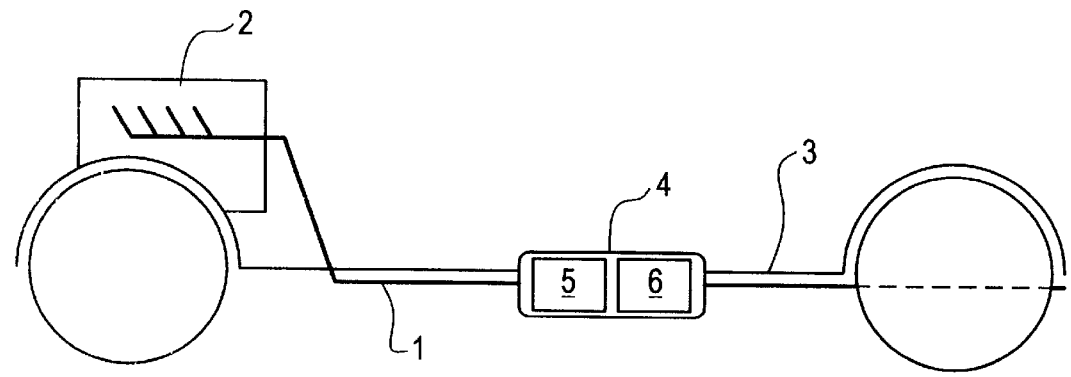
FIG. 2 is a schematic representation of an arrangement for an exhaust gas treatment unit including a sulfur trap and a nitrogen oxides storage catalyst in a vehicle with the sulfur trap and the storage catalyst located inside a common housing under the floor of the vehicle.

FIG. 2 shows a variant of the exhaust gas treatment unit in which the sulfur trap (5) is located directly upstream of the storage catalyst (6) at a distance of zero or approximately zero and both are accommodated in a common housing (4) under the floor of the vehicle.

The storage capacities of storage materials for nitrogen oxides and sulfur oxides exhibit a pronounced dependence on the temperature of the exhaust gas.

Figure 3:
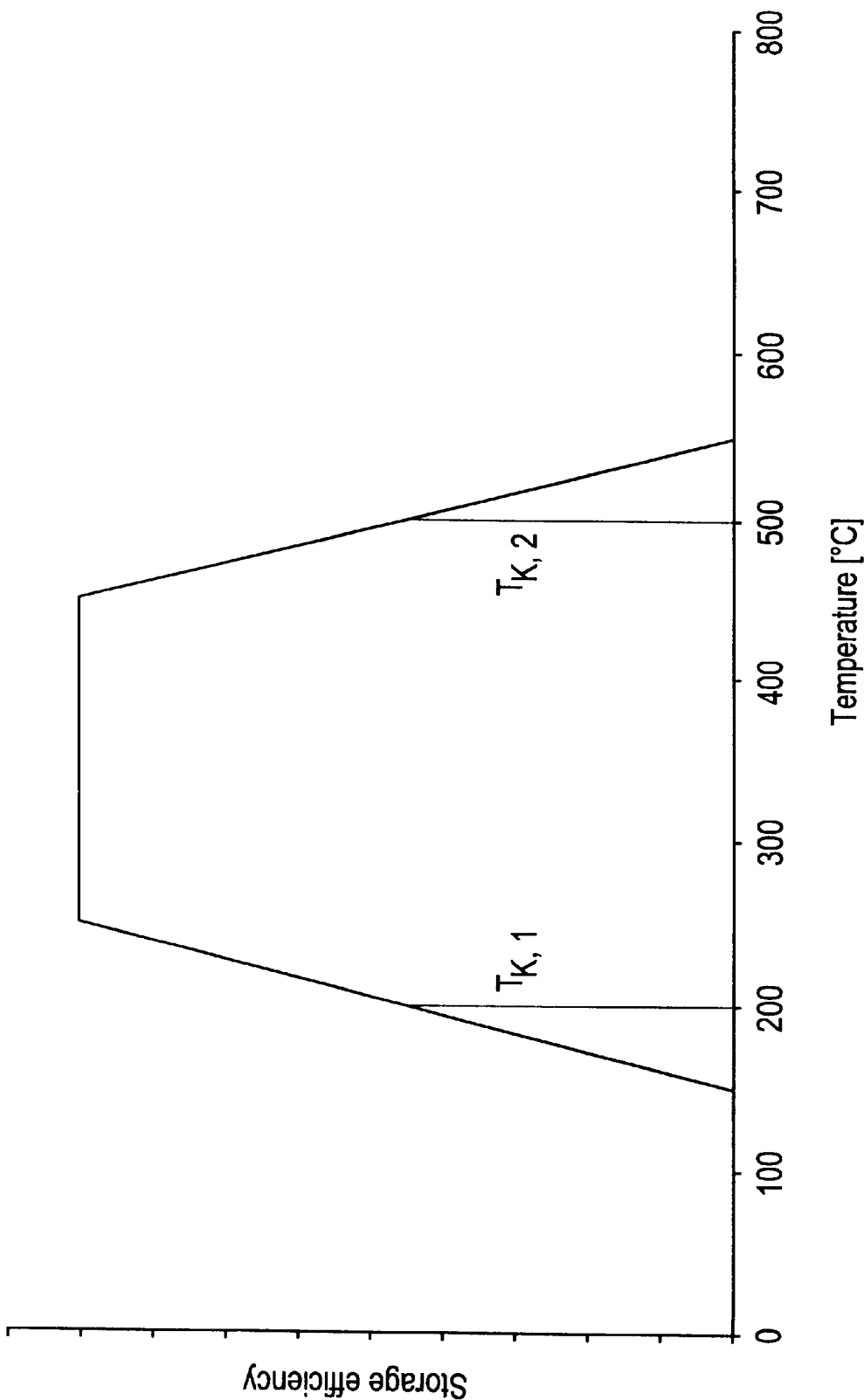
FIG. 3 is a schematic diagram of the activity window of a storage catalyst.

FIG. 3 shows the temperature dependence of the storage efficiency for a specific formulation of a nitrogen oxides storage catalyst. The storage of nitrogen oxides at normalized air/fuel ratios greater than 1 (lean exhaust gas) in the form of nitrates and release in the form of nitrogen oxides at normalized air/fuel ratios less than 1 takes place only within a restricted temperature interval, the lower limit $T_{K,1}$ being determined by the reaction kinetics of the formation of nitrogen dioxide and the upper limit $T_{K,2}$ being given by the thermodynamic stability of the alkali metal or alkaline earth metal nitrates and corresponding nitrites produced. This temperature interval is called the activity window $\Delta T_{NOX}$ of the storage catalyst in the context of the present invention and is used for the cyclic storage, release, or desorption, and reduction of the nitrogen oxides.

The activity window of the storage catalyst in FIG. 3 covers the temperature range from about 200° C. to 500° C. Different formulations of storage catalysts have activity windows which are shifted by 50–100° C. to lower or higher temperatures. Displacement of the activity window to lower temperatures is of particular interest for use in diesel vehicles where the exhaust gas is at a lower temperature.

Figure 4:
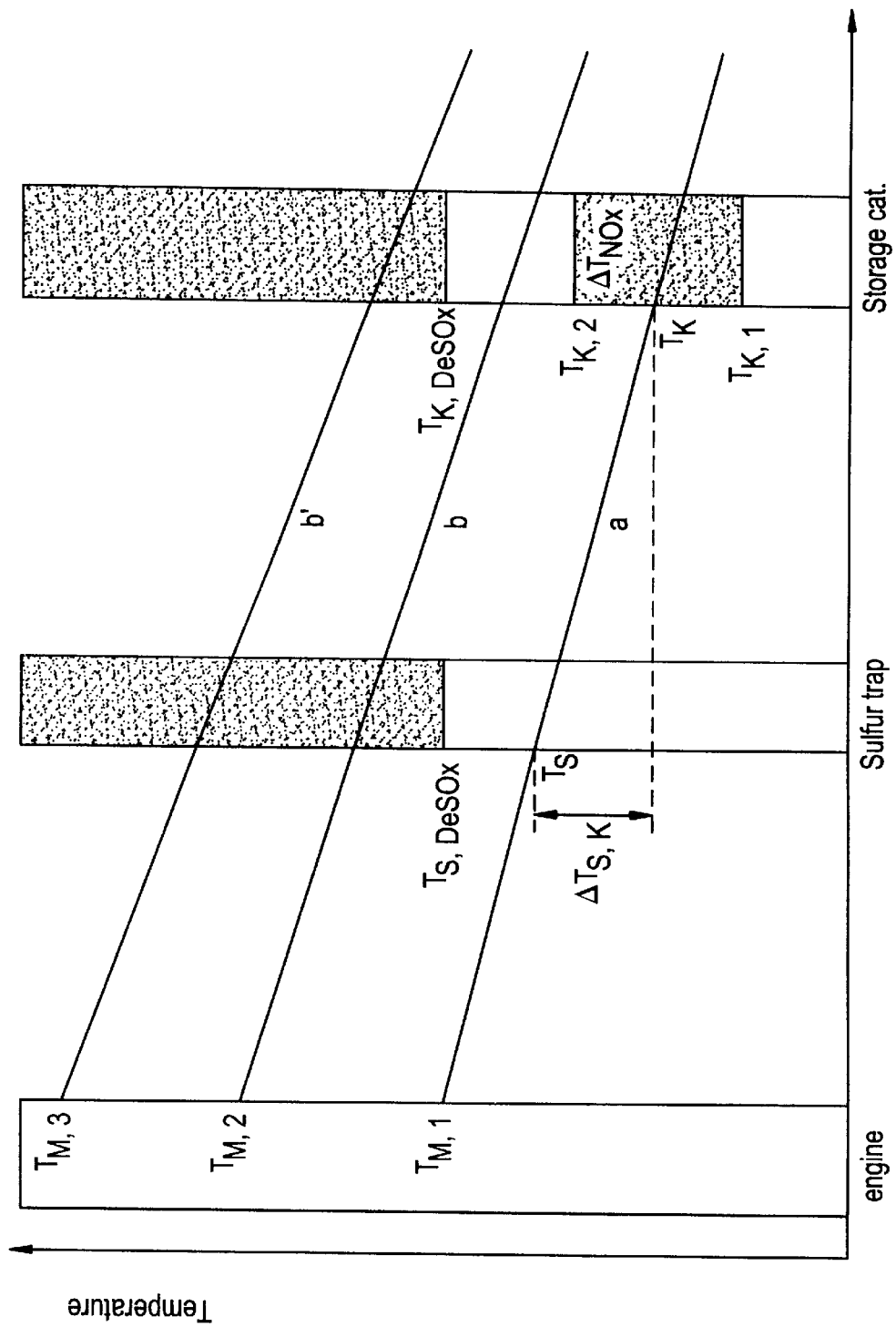
FIG. 4 is a schematic diagram of the change in temperature along the exhaust gas treatment unit from the engine to the storage catalyst for three different process steps with the sulfur trap and storage catalyst in separate locations.
Figure 5:
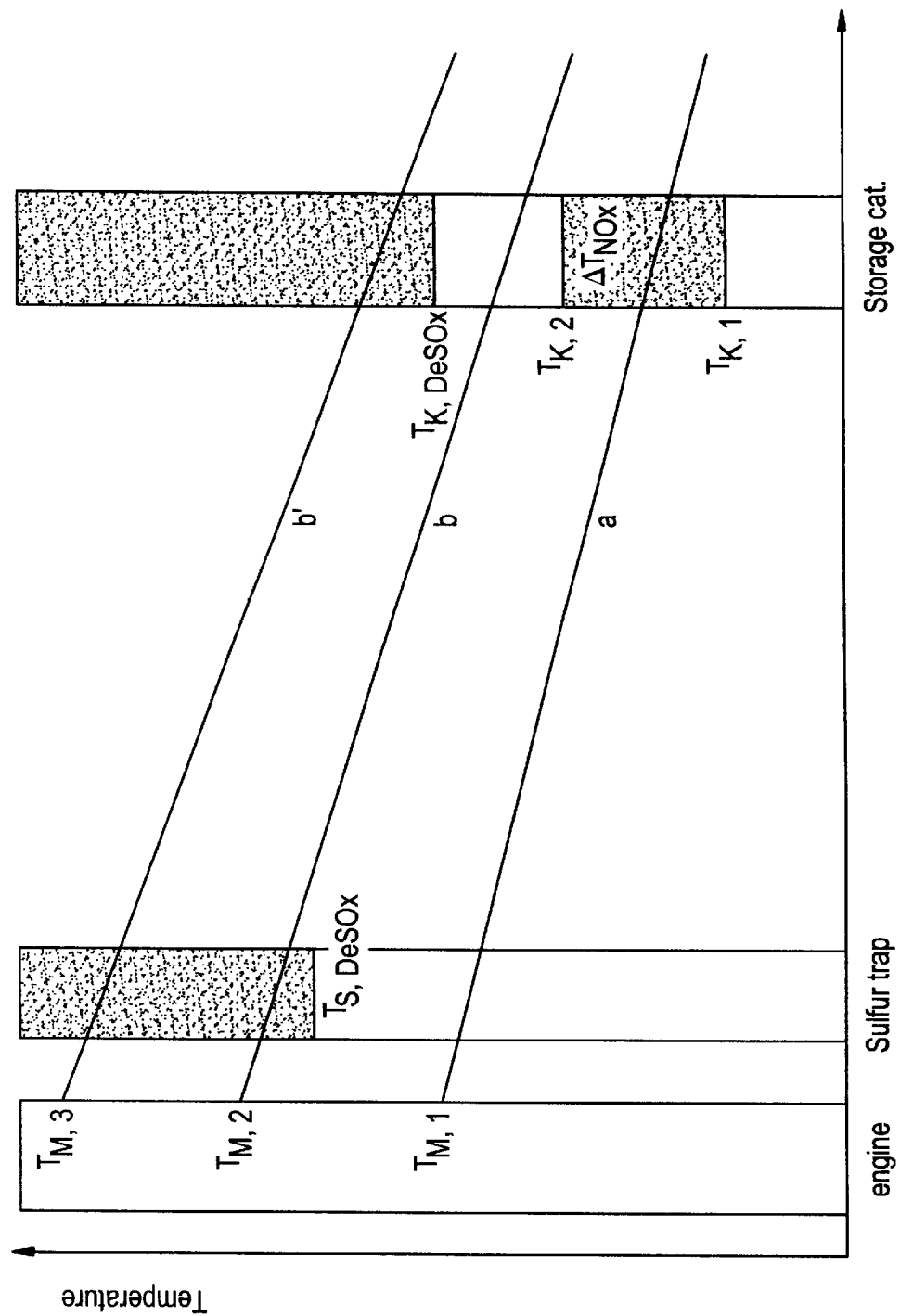
FIG. 5 is a schematic diagram of the change in temperature along the exhaust gas treatment unit from the engine to the storage catalyst for three different process steps and with the sulfur trap located close to the engine.
Figure 6:
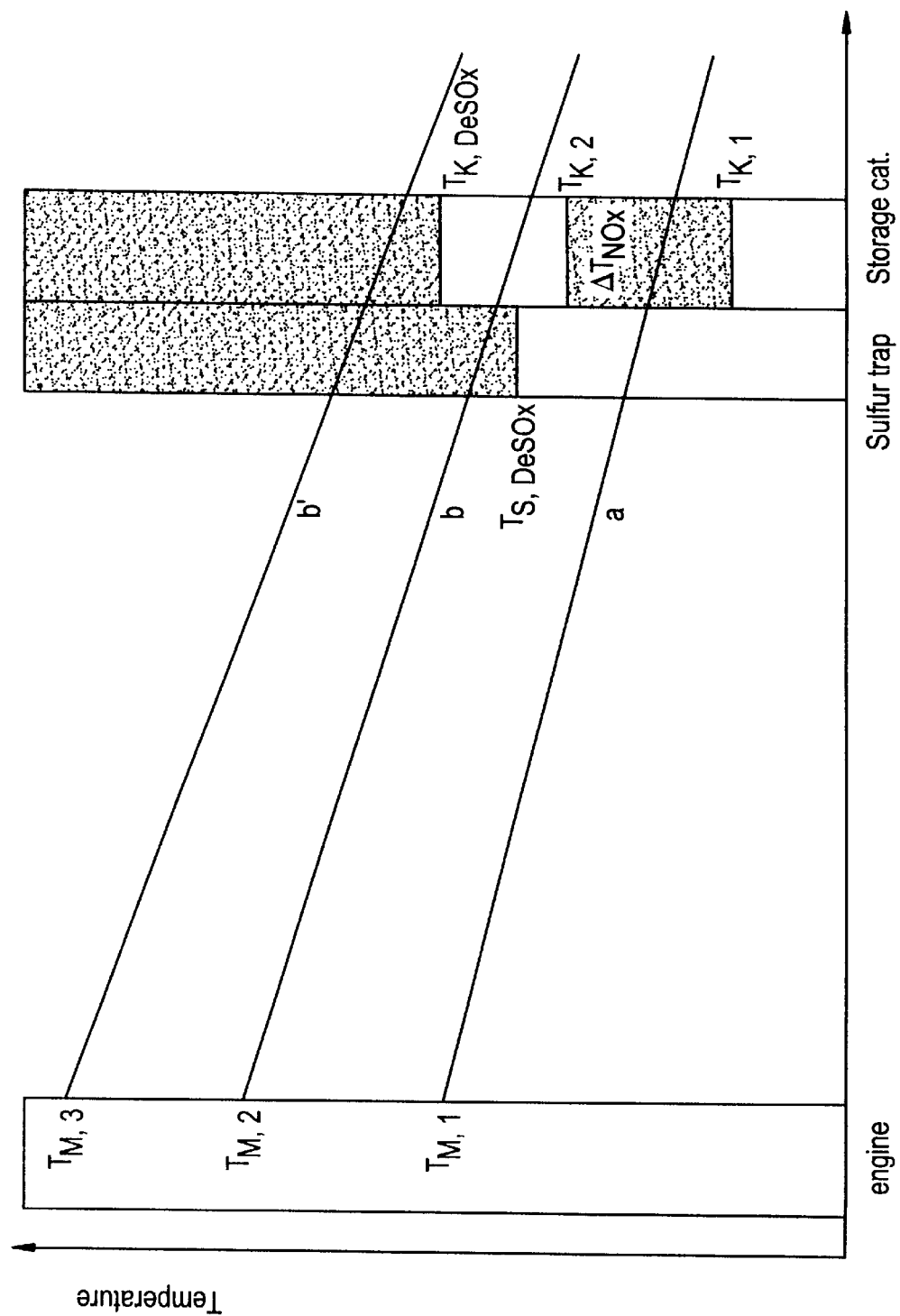
FIG. 6 is a schematic diagram of the change in temperature along the exhaust gas treatment unit from the engine to the storage catalyst for three different process steps and with the sulfur trap and storage catalyst located inside a common housing.
Figure 7:
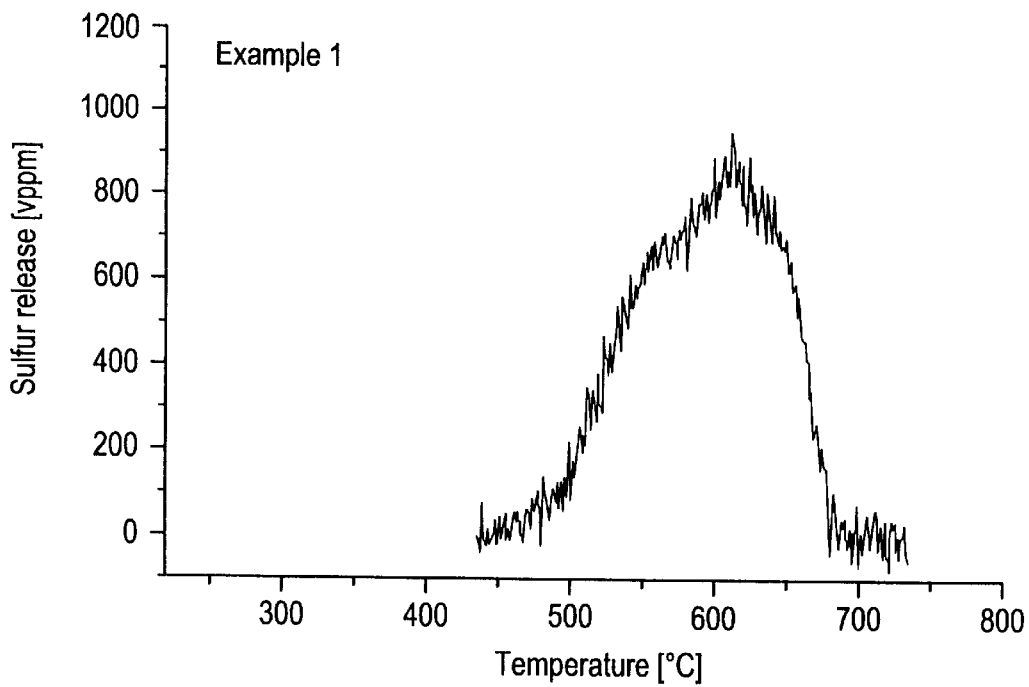
FIGS. 7–10 are graphical representations of the removal of sulfur from the sulfur traps in Examples 1 to 4.
Figure 8:
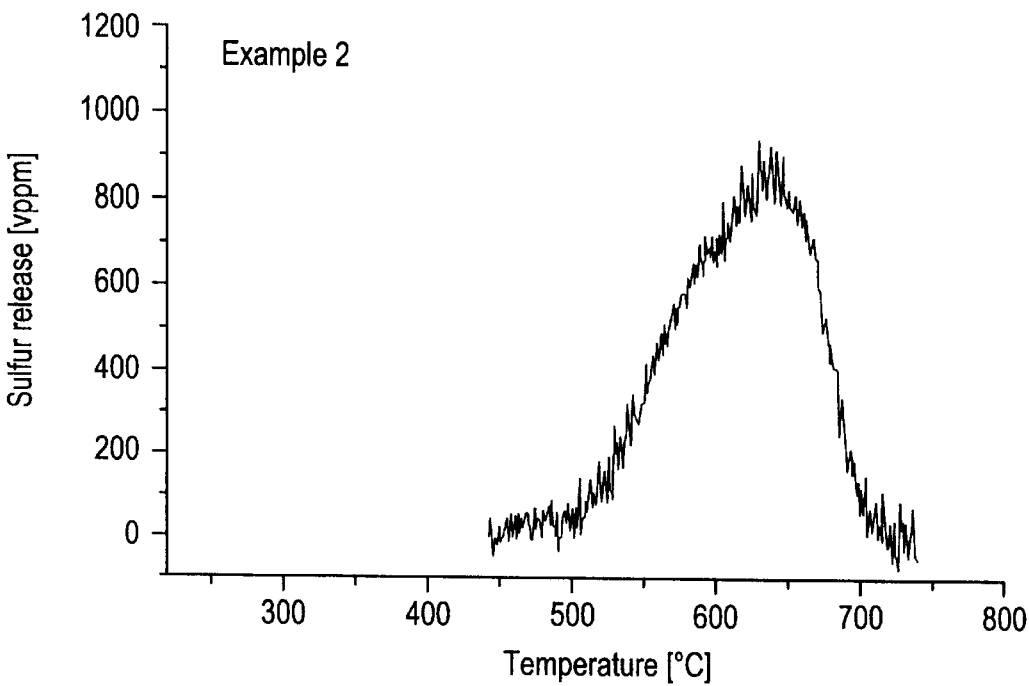
Figure 9:
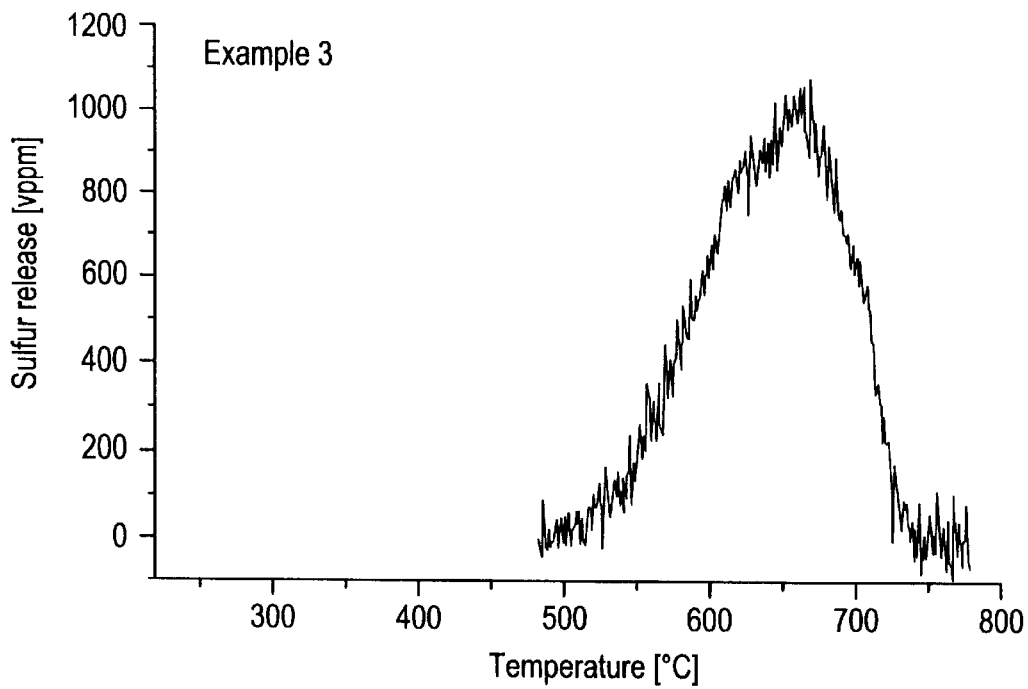
Figure 10:
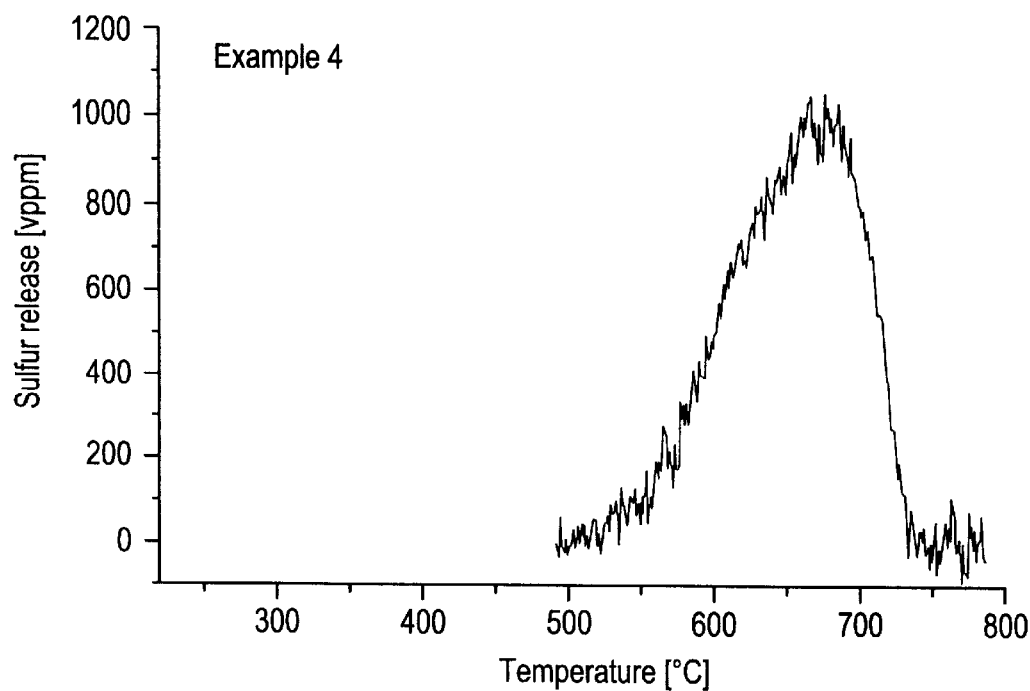
Figure 11:
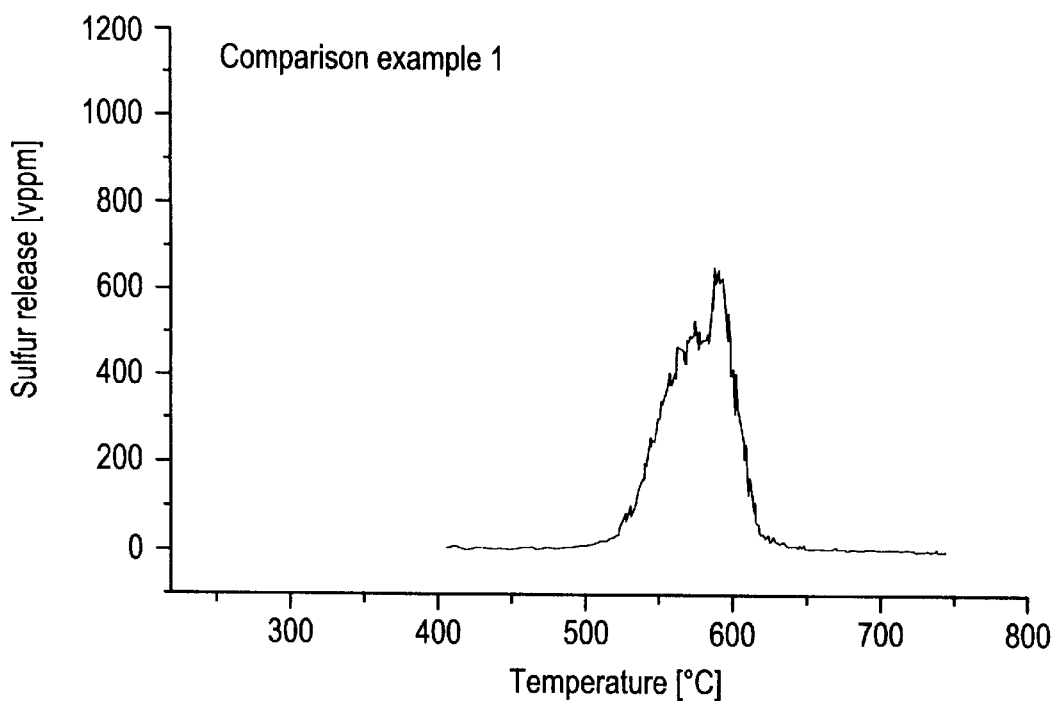
FIGS. 11–13 are graphical representations of the removal of sulfur from the sulfur traps in Comparison Examples 1 to 3.
Figure 12:
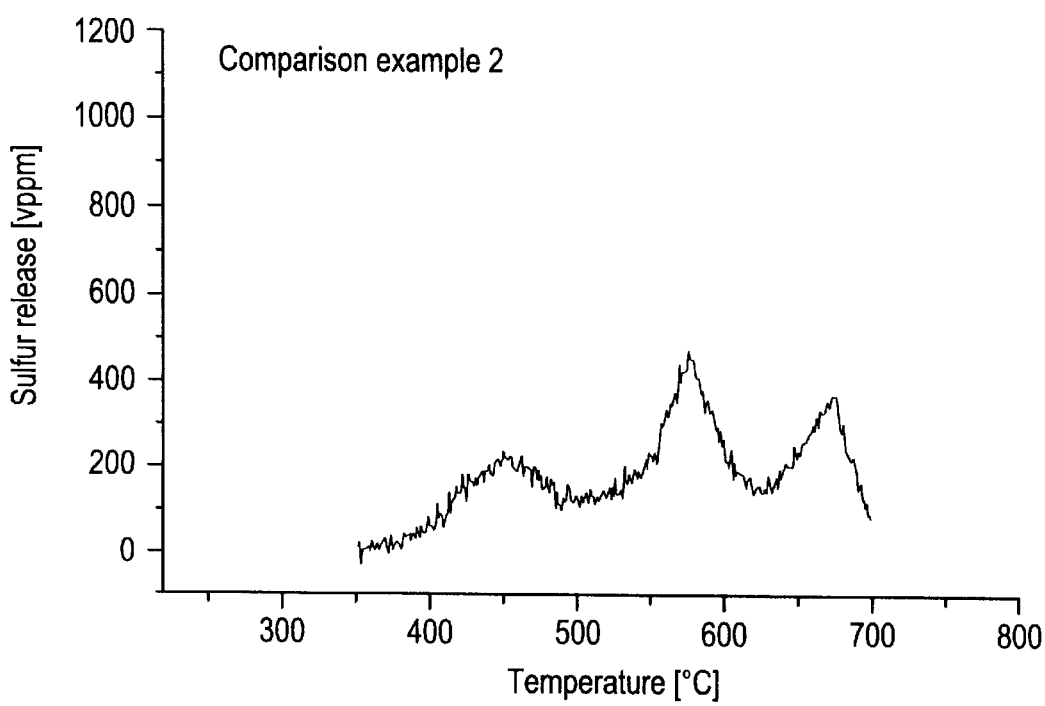
Figure 13:
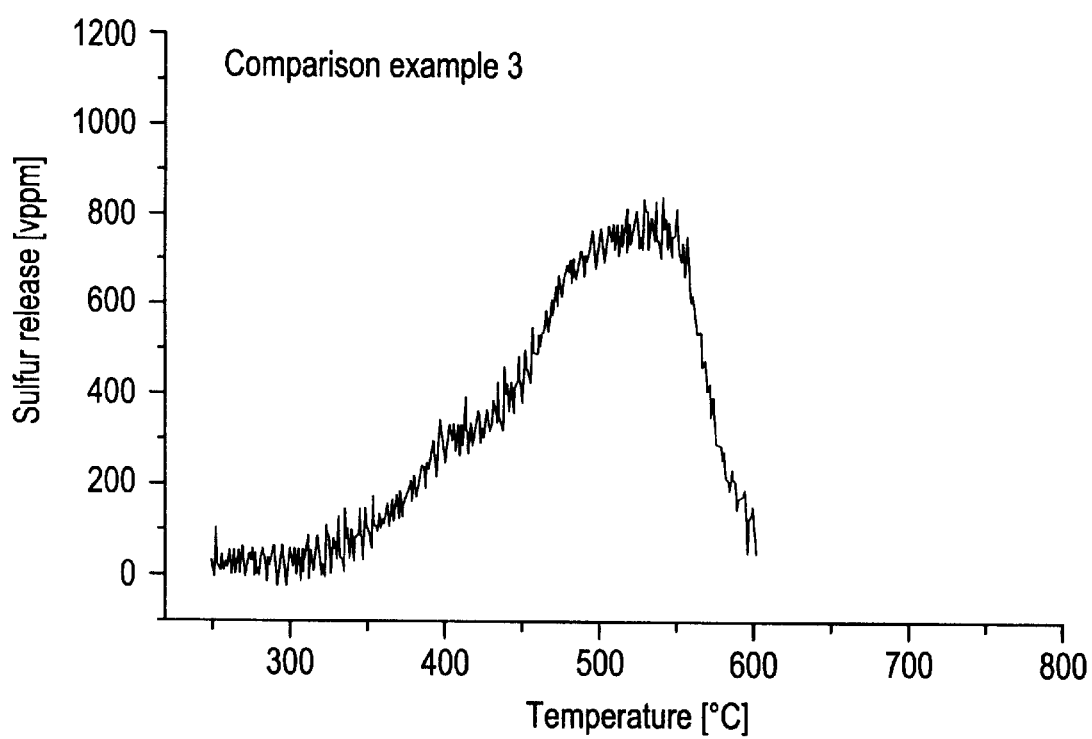

FIGS. 4 to 6 give schematic diagrams of the change in temperature along the exhaust gas treatment unit from the engine to the exhaust gas outlet for different arrangements of engine, sulfur trap and nitrogen oxides storage catalyst. The positions of these three parts along the exhaust gas treatment unit are indicated by vertical columns. The exhaust gas temperature at the particular location along the exhaust gas treatment unit is plotted along the ordinates. $T_{M,1}$, $T_{M,2}$ and $T_{M,3}$ denote three different temperatures of the exhaust gas at the engine outlet.

Starting from the engine outlet point temperature $T_M$, the exhaust gas temperature decreases along the exhaust gas unit due to conduction and radiation of heat. Typical temperature changes are 50 to 100° C. per meter of pipe length in the exhaust gas unit. For simplification, a linear drop in temperature is assumed in FIGS. 4 to 6. In fact, however, a more complex change in temperature is produced due to differing heat losses along the exhaust gas unit. In particular, localized increases in temperature may also occur due to exothermic reactions on the exhaust gas catalysts. Overall, the changes in temperature for a given exhaust gas unit as a function of the engine exhaust temperature are fairly reproducible and can readily be determined by a person skilled in the art.

The exhaust gas temperature just upstream of the entrance to the sulfur trap is denoted $T_S$ in FIG. 4. $T_K$ is the exhaust gas temperature just upstream of the entrance to the storage catalyst. $\Delta T_{S,K}$ is the temperature difference $T_S-T_K$ between the sulfur trap and the storage catalyst. This depends on the relative positions of the engine, sulfur trap and storage catalyst with respect to each other and on the engine exhaust temperature. The higher the engine exhaust temperature, the greater also is the temperature difference between the sulfur trap and the storage catalyst.

To operate the exhaust gas treatment unit in accordance with the process according to the invention, the materials in the sulfur trap and the storage catalyst have to be matched to each other in a suitable manner. The positions of the sulfur trap and the storage catalyst along the exhaust gas treatment unit are also very important when making this choice due to the changes in temperature described above.

In FIGS. 4 to 6, the activity window of the storage catalyst is represented by shading between the temperatures $T_{K,1}$ and $T_{K,2}$.

The cyclic storage on and release from the storage catalyst of the nitrogen oxides contained in the exhaust gas takes place under part-load operation and with a hot engine. This operating phase corresponds to step a) in the process and is given by temperature plot a in FIGS. 4 to 6.

When operating under part-load, the engine emits exhaust gas at an outlet temperature of $T_{M,1}$. The exhaust gas treatment unit is designed so that the exhaust gas temperature $T_K$ just upstream of the storage catalyst has dropped to a value within the activity window. According to the diagram in FIG. 4, the sulfur trap is incorporated about halfway between the engine and the storage catalyst in the exhaust gas path. The material in the sulfur trap thus has to be chosen so that under part-load operation the exhaust gas temperature $T_S$ does not rise above the sulfur desorption temperature $T_{S,DeSOx}$ for the sulfur trap. In the case of lean exhaust gas, the sulfur oxides are then stored on the sulfur trap and the nitrogen oxides are stored on the storage catalyst. During cyclic switching to normalized air/fuel ratios less than or equal to 1, the nitrogen oxides are released from the storage catalyst as nitrogen dioxide and are reduced to nitrogen by the reducing components in the exhaust gas (carbon monoxide, hydrocarbons and hydrogen). The sulfates stored on the sulfur trap, in contrast, are not released since the exhaust gas temperature $T_S$ is still lower than the sulfur desorption temperature $T_{S,DeSOx}$.

Process step a) comprises a storage and release cycle for the nitrogen oxides. It lasts for about 20 to 100 seconds, depending on the amount of raw emissions from the internal combustion engine. Of this time, only about 0.3 to 20 seconds are required for the release of nitrogen oxides, depending on the degree of enrichment of the exhaust gas. A nitrogen oxides storage cycle is regarded as concluded after release of the stored nitrogen oxides. Immediately after a nitrogen oxides cycle, there are thus no more nitrates which can readily be decomposed by enriching the exhaust gas resident on the storage catalyst.

After a predetermined number $N_1$ of nitrogen oxides storage cycles, process step b) is initiated to remove sulfur from the sulfur trap. For this, the engine exhaust temperature is raised to the value $T_{M,2}$ and the normalized air/fuel ratio of the exhaust gas is lowered to a value between 0.6 and 0.9.

$T_{M,2}$ is chosen so that the exhaust gas temperature then produced just upstream of the sulfur trap (temperature plot b) is above the sulfur desorption temperature. In order to avoid nitrogen oxides also being released from the storage catalyst during release of the sulfur dioxide from the sulfur trap, provision is made that sulfur removal from the sulfur trap is initiated, by raising the exhaust gas temperature, only after the conclusion of a nitrogen oxides storage cycle, that is with a regenerated storage catalyst.

In FIGS. 4 to 6, the temperature conditions for a preferred embodiment of the process according to the invention are shown. Positioning of the sulfur trap and the storage catalyst in the exhaust gas unit and the choice of storage materials for the sulfur trap and the storage catalyst take place in such a way that the exhaust gas temperature just upstream of the storage catalyst, during sulfur removal from the sulfur trap, is above the activity window of the storage catalyst. Thus, the equation given below represents the relationship between the sulfur desorption temperature $T_{S,DeSOx}$, the temperature difference $\Delta T_{S,K}$ between the exhaust gas temperatures $T_S$ just upstream of the sulfur trap and $T_K$ just upstream of the storage catalyst and the upper limiting temperature $T_{K,2}$ of the activity window for the storage catalyst:

$$T_{K,2}+\Delta T_{S,K}>T_{S,DeSOx}$$

Under these conditions, it is ensured that stored nitrogen oxides are no longer present on the storage catalyst during desorption of sulfur dioxide from the sulfur trap. Thus renewed oxidation of the desorbed sulfur components (sulfur dioxide and hydrogen sulfide) to give sulfur trioxide, by reacting with nitrogen oxides and storage on the storage catalyst, is reliably prevented. There is, at the very most, negligible overlapping of the periods of release of sulfur dioxide and nitrogen dioxide.

Raising the engine exhaust temperature, which is an important feature of the process according to the invention, can be performed by suitable modification of the operating parameters for the engine without any noticeable change in the torque, so that driving comfort is not thereby affected.

Process steps a) and b) described above are repeated cyclically. The number of nitrogen oxides storage cycles (process step a)) between two sulfur removal procedures for the sulfur trap (process step b)) is generally between 10 and 100,000. The actual number $N_1$ used depends on a number of parameters, such as sulfur content of the fuel, the volumes of the sulfur trap and storage catalyst, the degree of lean-mix used during practical driving operation, the type of engine, the mode of operation of the engine (motorway or urban driving) and on the particular methods offered by the vehicle manufacturer for heating up the exhaust gas. $N_1$ should be chosen to be as large as possible to keep the additional fuel consumption required to heat the sulfur trap as small as possible.

During operation of an internal combustion engine mounted in a vehicle, there are so-called natural enrichment phases, when accelerating and when running under full load, which interrupt the progress of the process according to the invention. Since the storage of sulfur oxides on the sulfur trap continues during these operating phases, these natural enrichment phases also have to be included in $N_1$.

Storage materials for sulfur oxides are extremely efficient. Nevertheless, slow loading of the storage catalyst with sulfates may take place due to a small degree of slippage of sulfur oxides, and this may reduce the storage capacity for nitrogen oxides. Therefore, in a preferred embodiment of the process according to the invention, an additional process step b') to remove sulfur from the storage catalyst may be provided after each number $N_2$ of nitrogen oxides storage cycles. The alkali metal and alkaline earth metal oxides conventionally used for nitrogen oxides storage produce sulfates with a very high sulfur desorption temperature $T_{K,DeSOx}$. The engine exhaust temperature of the exhaust gas must therefore be raised to above $T_{M,2}$, to the value $T_{M,3}$ in order to raise the exhaust gas temperature just upstream of the storage catalyst $T_K$, despite its relatively large distance from the engine outlet, to above its sulfur desorption temperature $T_{K,DeSOx}$. The normalized air/fuel ratio of the exhaust gas must again be lowered to below the value 1 during sulfur removal from the storage catalyst.

Sulfur removal from the storage catalyst has to be performed relatively rarely with perfect functioning of the components used. Typically, 2 to 100 sulfur removal procedures for the sulfur trap have to be performed before sulfur removal from the storage catalyst is required, that is the number $N_2$ of nitrogen oxides cycles between two sulfur removal procedures for the storage catalyst is about 2, to 100 times greater then $N_1$.

To remove sulfur from the sulfur trap and optionally from the storage catalyst, the normalized air/fuel ratio of the exhaust gas is lowered to a value between 0.96 and 1.01, preferably between 0.97 and 1.0. Alternatively, the normalized air/fuel ratio of the exhaust gas may also be lowered to a value between 0.6 and 0.8 in order to remove sulfur from the sulfur trap and optionally from the storage catalyst. In this case, largely hydrogen sulfide is released from the sulfur trap. In order to suppress emission of hydrogen sulfide into the environment, secondary air may be added to the exhaust gas unit during sulfur removal from the sulfur trap, this raising the normalized air/fuel ratio at the entrance to the storage catalyst to a value between 0.98 and 1.01.

In FIG. 4 it is assumed that the sulfur trap has the same sulfur removal temperature as the storage catalyst. As a result of locating the sulfur trap half-way between the engine and the storage catalyst, however, the engine exhaust temperature $T_{M,2}$ required for sulfur removal is kept much lower than in the arrangement with the sulfur trap immediately upstream of the storage catalyst.

FIG. 5 shows the temperature conditions when the sulfur trap is located immediately downstream of the engine. In this case, a storage material with a high sulfur desorption temperature may be chosen for the sulfur trap without having to raise the engine exhaust temperature $T_{M,2}$ above that shown in FIG. 4 in order to remove sulfur from the sulfur trap.

FIG. 6 shows an arrangement with the sulfur trap immediately upstream of the storage catalyst. With this arrangement, in order to perform the process according to the invention, a storage material with a lower sulfur desorption temperature than the storage catalyst has to be chosen for the sulfur trap. This type of material would be completely unsuitable for the sulfur trap located near the engine shown in FIG. 5 since its sulfur desorption temperature is below the engine exhaust temperature $T_{M,1}$ for normal part-load operation. The sulfur trap in FIG. 6 cannot be realistically used as a sulfur trap in the arrangement shown in FIG. 5.

The diagrams in FIGS. 4 to 6 make it clear that the materials used have to be matched to each other in a suitable manner, depending on the location of the sulfur trap and the storage catalyst in the exhaust gas unit.

Known storage components are preferably used for the nitrogen oxides storage catalyst. These are compounds of lithium, sodium, potassium, cesium, rubidium, calcium, strontium, barium, lanthanum and yttrium. At least one metal from the platinum group of elements, platinum, palladium, rhodium and iridium are used as the catalytically active component.

The requirements placed on the storage material for the sulfur trap, when using the process according to the invention, are:

a high storage capacity for sulfur oxides, and as high as possible a rate of decomposition of the stored sulfates above the sulfur desorption temperature.

These requirements are not satisfied by all of the storage materials known from the prior art.

Sulfur oxide storage components consisting of compounds of the alkaline earth metals magnesium, calcium, strontium and barium or of lanthanum are suitable for the process according to the invention. These materials may be used individually or as a mixture, depending on the temperature requirements for sulfur removal and the storage capacities required.

Storage components based on Mg/Al hydrotalcite have proven particularly suitable for the process. This is a double-sheet hydroxide of magnesium oxide and aluminum oxide. Commercially available Mg/Al hydrotalcite is supplied with molar ratios of magnesium oxide to aluminum oxide between 1 and 6. The preparation of synthetic hydrotalcite is described, for example, in WO 96/05140.

It is expedient to calcine the Mg/Al hydrotalcite at temperatures of 400 to 600° C. for a period of 1 to 10 hours prior to use as a sulfur trap. Its specific surface area (BET surface area, measured in accordance with DIN 66132) is in the range between 100 $m^2/g$ and 300 $m^2/g$.

The Mg/Al hydrotalcite is converted into Mg/Al spinel ($MgO.Al_2O_3$) by calcination. The magnesium oxide, which is present in stoichiometric excess, is homogeneously distributed in the spinel produced and stabilizes its specific surface area. Conversion of hydrotalcite into spinel may also take place in the final sulfur trap as a result of the hot exhaust gases. In the context of reproducible production, however, calcination of the hydrotalcite prior to use as a sulfur trap is recommended.

Mg/Al hydrotalcite may be doped, with an amount of 0.5 to 40 wt. % with respect to its total weight, with at least one element from the group which consists of the alkaline earth elements calcium, strontium, barium and the rare earth oxides. The sulfur removal temperature of the material can be displaced within certain limits in this way and thus adjusted to the requirements of the process.

Doping may be performed before or after calcination of the hydrotalcite. The doping elements are preferably introduced by impregnating the hydrotalcite or the spinel with soluble precursors of the doping elements.

Materials which are not suitable for the process according to the invention are iron oxide, manganese oxide and cerium oxide which are frequently used in the prior art. Iron oxide has an inadequate storage capacity and inadequate thermal stability. Manganese oxide has a very wide sulfur removal range which extends down to relatively low temperatures. The same applies to cerium oxide. Clear separation of sulfur removal from the sulfur trap and the activity window of conventional storage catalysts, as is required by the process presented here, is not really possible with these materials.

Oxidation to give sulfur trioxide, which is required for storage of the sulfur oxides, may take place directly on the sulfur trap. The sulfur trap may be provided, for example, with at least one metal from the platinum group of elements, platinum, palladium, rhodium and iridium, using known techniques, for this purpose.

In special cases of application it may be advantageous to use a conventional exhaust gas catalyst, which can also store sulfur oxides by adding the corresponding storage components, as a sulfur trap (see Example 6). In this event, any steps and materials known to a person skilled in the art such as, for example, monolayered or multilayered catalysts, may be used. The sulfur trap may then support the reactions of carbon monoxide, hydrocarbons and nitrogen oxides proceeding on the nitrogen oxides storage catalyst and in addition take on the function of a starter catalyst during warming up operation of the internal combustion engine.

A further advantageous variant of the process according to the invention comprises using a noble metal-free sulfur trap and inserting a noble metal-containing catalyst upstream in the exhaust gas stream. In this way, the oxidation of sulfur oxides to sulfur trioxide takes place on the upstream catalyst, while the sulfur trap simply absorbs the sulfur trioxide produced in that way.

The sulfur trap is prepared by using known techniques for the preparation of car exhaust gas catalysts. The storage material is preferably applied in the form of a coating on the flow channels of honeycomb structures made of ceramic or metal. To achieve this, the material, in finely divided oxidic form, optionally mixed with other support materials known from car exhaust catalysis (active aluminum oxide, zirconium oxide, titanium oxide), is processed to form an aqueous coating dispersion and applied to the honeycomb structure by immersion. This mode of operation is used in particular in the case of Mg/Al hydrotalcite. Alternatively, the storage materials may also be applied, in the form of their soluble precursors, to support materials with high surface areas, for example by impregnation. This may take place before or after application of the support materials to the honeycomb structure. The catalytically active components (platinum, palladium, rhodium, ruthenium, iridium, osmium) may be introduced to the sulfur trap in a similar manner. Furthermore, the sulfur trap may also be provided with promoters from the group of transition metal oxides. Suitable transition metals which support the catalytic function of the sulfur trap are zinc, nickel, chromium, cobalt, copper and silver.

Thus, sulfur traps may be used in the process according to the invention which consist of several components. A preferred sulfur trap consists, for example, of a mixture of aluminum oxide and Mg/Al hydrotalcite or Mg/Al spinel with excess magnesium oxide. In addition, the spinel may also be doped with alkaline earth metals. In principle, each of these compounds is able to bond sulfur trioxide in the form of sulfates.

If, for example, aluminum oxide is used as the only material, then the sulfur components are bonded in the form of aluminum sulfate. However, this greatly reduces the specific surface area of the aluminum oxide. This has the result that the rate of formation of aluminum sulfate decreases with increasing ageing of the sulfur trap. By mixing the aluminum oxide with, for example, magnesium oxide or barium oxide, this ageing process can largely be prevented since in this case the more stable alkaline earth sulfates are formed preferentially.

In the following examples and comparison examples, different formulations of sulfur traps were prepared on ceramic honeycomb structures and compared with each other. In order to ensure comparability of the different formulations, the amounts of individual components were selected in such a way that the theoretical total storage capacity of the sulfur traps in all the examples was about 4.7 moles of sulfate per liter of final sulfur trap. It is assumed here that aluminum oxide can be completely converted into aluminum sulfate and magnesium oxide can be completely converted into magnesium sulfate. The same applies to the doping elements. The particular amount of doping element was selected in such a way that its theoretical storage capacity was 0.17 moles of sulfur per liter. The storage capacity of the spinel was calculated as the sum of the storage capacities of the magnesium oxide and aluminum oxide fractions contained therein.

Platinum was used as a noble metal component in all the sulfur traps.

EXAMPLE 1

An aqueous dispersion of $\gamma$-$Al_2O_3$ (particle size 4 $\mu$m ($d_{50}$) and Mg/Al hydrotalcite (particle size 4 $\mu$m ($d_{50}$)) with a ratio by weight of $\gamma$-$Al_2O_3$ to Mg/Al hydrotalcite of 3:14 was made up. The Mg/Al hydrotalcite had a molar ratio MgO/$Al_2O_3$ of 2.6 and was pretreated by calcining at 550° C. in air for a period of 4 hours. The material then had a specific surface area of 200 $m^2$/g.

Several honeycomb structures of cordierite with a cell density of 62 $cm^{-2}$ were coated with a total of 170 g of dry material per liter of honeycomb structure volume (140 g/l of hydrotalcite and 30 g/l of g-$Al_2O_3$) by immersion in this dispersion. The coating was dried at 120° C. and calcined at 500° C. in air for 2 hours. Then the coated honeycomb structures were impregnated by immersion in an aqueous solution of platinum tetraammine nitrate $Pt(NH_3)_4(NO_3)_2$, dried at 120° C. and calcined at 500° C. in air for 2 hours. The final sulfur trap contained 2 g of platinum per liter of honeycomb structure.

EXAMPLE 2

A sulfur trap prepared in Example 1 was loaded with 10 g of calcium oxide per liter of sulfur trap by immersing in an aqueous solution of calcium nitrate, drying at 120° C. and calcining at 500° C. in air.

EXAMPLE 3

Another sulfur trap prepared in Example 1 was loaded with 17.5 g of strontium oxide per liter by immersing in an aqueous solution of strontium acetate, drying at 120° C. and calcining at 500° C. in air.

EXAMPLE 4

Another sulfur trap prepared in Example 1 was loaded with 26.0 g of barium oxide per liter by immersing in an aqueous solution of barium acetate, drying at 120° C. and calcining at 500° C. in air.

EXAMPLE 5

Another sulfur trap prepared in Example 1 was loaded with 18.5 g of lanthanum oxide per liter by immersing in an aqueous solution of lanthanum acetate, drying at 120° C. and calcining at 500° C. in air.

EXAMPLE 6

100 g of $\gamma$-$Al_2O_3$ (specific surface area 140 $m^2$/g) were loaded with 3 g of rhodium by impregnating with an aqueous solution of rhodium nitrate $Rh(NO_3)_3$, drying at 120° C. and calcining at 500° C. in air. The Rh/$Al_2O_3$ powder prepared in this way was stirred into water and milled to a particle size of 4 $\mu$m ($d_{50}$).

Another of the sulfur traps prepared in Example 1 was loaded with 30 g of Rh/$Al_2O_3$ per liter of honeycomb structure by immersing in the dispersion of Rh/$Al_2O_3$. The sulfur trap obtained in this way was dried at 120° C. and calcined at 500° C. in air.

Comparison Example 1

To prepare a conventional sulfur trap, an aqueous dispersion of γ-$Al_2O_3$ (surface area 140 $m^2$/g, particle size $d_{50}$=4 μm) was made up and another cordierite honeycomb structure was coated with 170 g of γ-$Al_2O_3$ per liter of honeycomb structure volume by immersing in this dispersion. The coating was dried at 120° C. and calcined at 500° C. for 2 hours in air.

The coating was impregnated with an aqueous solution of platinum tetraammine nitrate, again dried at 120° C. and calcined at 500° C. for 2 hours in air. The final coating contained 2 g of platinum per liter of honeycomb structure volume. Following this, the coating was then impregnated by renewed immersion in an aqueous solution of iron (III) nitrate, dried at 120° C. and calcined at 500° C. for 2 hours in air. The calcined coating contained iron in an amount of 9.1 g per liter, calculated as iron (III) oxide.

Comparison Example 2

Another conventional sulfur trap was prepared in the same way as in Comparison Example 1. Differently from Comparison Example 1, the coating was not impregnated with iron nitrate but with manganese acetate. The final sulfur trap contained manganese in an amount of 14.8 g per liter of honeycomb structure volume, calculated as manganese (IV) oxide.

Comparison Example 3

Another conventional sulfur trap was prepared in the same way as in Comparison Example 1. Differently from Comparison Example 1, the coating was not impregnated with iron nitrate but with cerium nitrate. The final sulfur trap contained cerium in an amount of 29.2 g per liter of honeycomb structure volume, calculated as cerium (IV) oxide.

The compositions of the sulfur traps made up in the preceding examples are summarised in Table 1.

Application Example

The storage capacity under lean exhaust gas conditions, the avoidance of secondary emissions during release of the stored sulfur in the form of hydrogen sulfide $H_2S$ and carbonyl sulfide COS and also the sulfur desorption temperature $T_{S,DeSOx}$ and the rate of release of sulfur oxides as a function of exhaust gas temperature and the normalized air/fuel ratio in the exhaust gas are important for effective use of a sulfur trap in the process according to the invention.

To assess the sulfur traps in accordance with Examples 1 to 5 and Comparison Examples 1 to 3, therefore, the following tests were performed:

The sulfur traps described in the examples were first loaded with sulfur for 5 hours in a lean-burn petrol engine which operated with a normalized air/fuel ratio of 1.5, using a fuel with a sulfur concentration of 400 ppm by wt. The exhaust gas temperature just upstream of the sulfur trap was 400° C. Each of the sulfur traps used had a volume of 0.8 liters. The throughput of exhaust gas was 42,000 Nl/h.

First, the raw emissions from the engine of sulfur dioxide, hydrogen sulfide and carbonyl sulfide were determined using an ion-molecule reaction mass spectrometer (IMR-MS). After incorporating each sulfur trap into the exhaust gas unit, the change in emissions with time just downstream of the sulfur trap was measured. From these experimental values, both the amount of sulfur emitted by the engine and the amount of sulfur absorbed by the sulfur traps were calculated by integrating over time. Then the sulfur traps were slowly heated to 750° C. at a normalized air/fuel ratio of 0.98. Using the IMR-MS the concentrations of sulfur dioxide, hydrogen sulfide and carbonyl sulfide given off by the sulfur traps in the exhaust gas stream during the heating process were determined as a function of time and temperature. The results of the tests are given in Table 2 below and in FIGS. 7 to 13.

The measurements show that the amounts of sulfur emitted from the engine during the lean-burn running time were approximately quantitatively absorbed by the sulfur traps in Examples 1 to 4. During sulfur removal in a rich exhaust gas, the sulfur could again be largely quantitatively released. Comparison Example 1, in contrast, exhibits a much lower sulfur absorption. Sulfur removal, however, also proceeded here almost quantitatively. Comparison Example 2 exhibited a very broad desorption range for sulfur, which did not permit rapid sulfur removal from the sulfur trap. In addition, sulfur removal started, as also with Comparison Example 3, at very low temperatures. Overlapping of sulfur release with the activity window for conventional storage catalysts cannot be prevented in this case.

TABLE 1

Composition of sulfur traps

| Example | γ-$Al_2O_3$ [g/l] | Hydrotalcite [g/l] | Doping Material | [g/l] | Platinum [g/l] |
|---|---|---|---|---|---|
| E1 | 30 | 140 | — | — | 2 |
| E2 | 30 | 140 | CaO | 10 | 2 |
| E3 | 30 | 140 | SrO | 17.5 | 2 |
| E4 | 30 | 140 | BaO | 26 | 2 |
| E5 | 30 | 140 | $La_2O_3$ | 18.5 | 2 |
| E6 | 30 + 30 g Rh/$Al_2O_3$ | 140 | — | — | 2 + 0.9 g Rh |
| CE1 | 160 | | Iron oxide | 9.1 | 2 |
| CE2 | 160 | | Manganese oxide | 14.8 | 2 |
| CE3 | 160 | | Cerium oxide | 19.5 | 2 |

TABLE 2

Experimental results

| Example | Sulfur emitted as $SO_2$ [g] | Sulfur released in [g] as | | | $SO_2/H_2S/COS$ Desorption [° C.] | |
|---|---|---|---|---|---|---|
| | | $SO_2$ | $H_2S$ [g] | COS [g] | $T_{S,DeSOx}$ | $T_{end}$ |
| E1 | 4.53 | 4.11 | 0.02 | not measurable | 475 | 675 |
| E2 | 4.49 | 3.93 | 0.03 | not measurable | 500 | 700 |
| E3 | 4.65 | 4.61 | 0.01 | not measurable | 520 | 730 |
| E4 | 4.43 | 4.32 | 0.01 | not measurable | 550 | 735 |
| CE1 | 4.46 | 1.33 | 0.03 | not measurable | 520 | 610 |
| CE2 | 4.61 | 2.47 | 0.02 | not measurable | 400 | 700 |
| CE3 | 4.55 | 4.41 | 0.01 | not measurable | 350 | 600 |

The last two columns in Table 2 give the temperature of the exhaust gas at the start of sulfur removal $T_{S,DeSOx}$ and the final temperature $T_{end}$ after conclusion of sulfur removal. The difference between the two should be as small as possible in order to ensure rapid sulfur removal from the sulfur trap. With Examples 1 to 4 according to the invention, the temperature difference was 200, 210 and 185° C. With Comparison Examples CE2 and CE3, values of 300 and 250° C. were measured. The temperature difference in Comparison Example 1 was only 90° C.

Furthermore, the tests show that secondary emissions of hydrogen sulfide and carbonyl sulfide at the value for the normalized air/fuel ratio of 0.98 selected for sulfur removal, in all the examples and comparison examples, are only a fraction of the sulfur dioxide emissions.

The temperature range in which these sulfur traps release the stored sulfates again under enriched conditions is critical for use of the formulations described above as sulfur traps in accordance with the invention. According to the present invention, this temperature range must be above the activity window for the storage catalyst used with a cyclic lean/rich operation plus the temperature difference in the exhaust gas existing between the sulfur trap and the storage catalyst.

This condition is satisfied for the sulfur traps in Examples 1 to 5.

Removal of sulfur from the sulfur trap and the storage catalyst causes an additional fuel consumption in order to bring the exhaust gas unit, containing the sulfur trap and the storage catalyst, up to the temperatures required for sulfur removal and to provide a sufficiently high amount of reducing constituents in the exhaust gas for reduction of the stored sulfates. To minimize the additional fuel consumption, sulfur removal should be performed at the lowest possible temperature and in the shortest possible time in order to keep the heat losses which occur low.

During sulfur removal, secondary emissions of hydrogen sulfide and carbonyl sulfide should be kept low. The secondary emissions depend substantially on the normalized air/fuel ratio used for sulfur removal. As shown in the following tests, two preferred ranges of normalized air/fuel ratios are observed for sulfur removal. The first region is close to the stoichiometric point, between about 0.97 and 1.0, the second is between 0.6 and 0.8.

Figure 14:
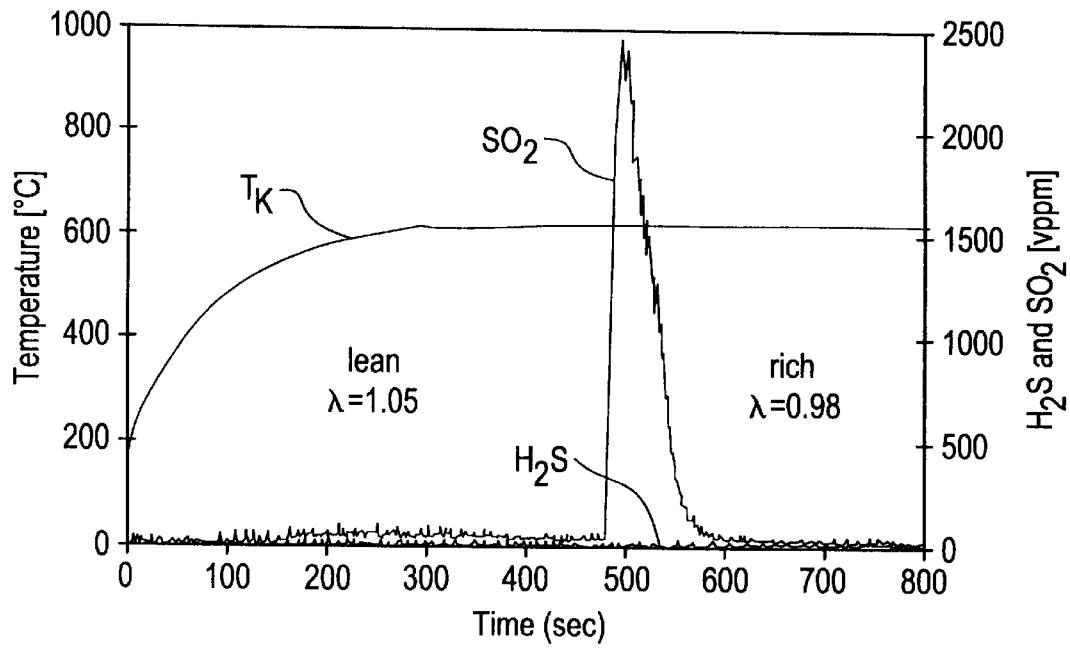
FIG. 14 is a graphical representation of the sulfur removal characteristics of a sulfur trap at 640° C. when lowering the normalized air/fuel ratio to a value of 0.98.
Figure 15:
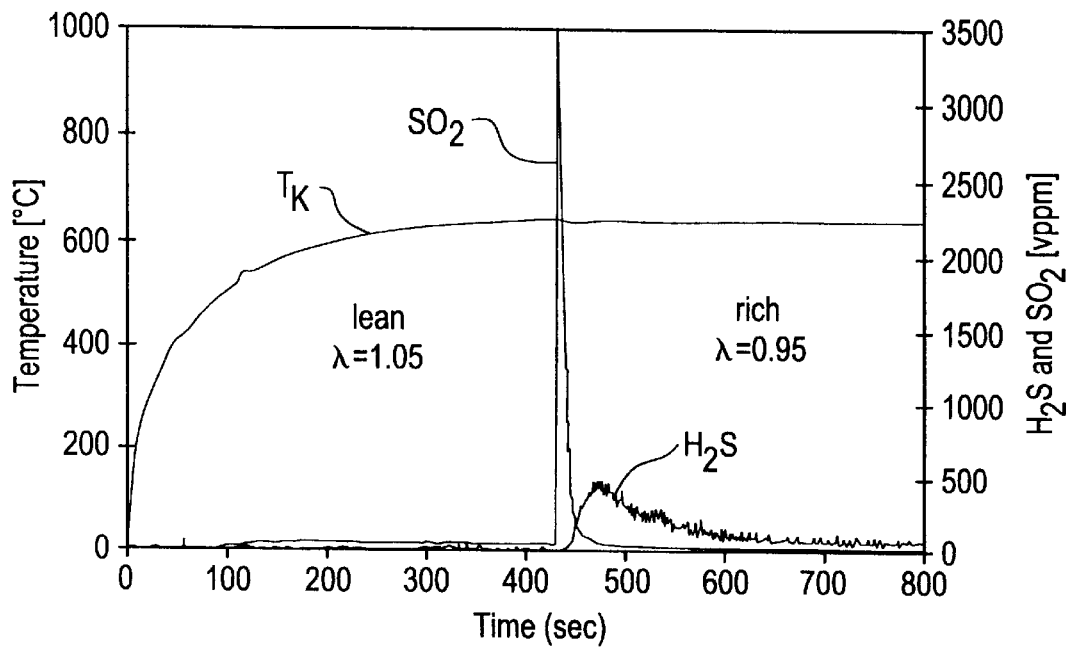
FIG. 15 is a graphical representation of the sulfur removal characteristics of a sulfur trap at 640° C. when lowering the normalized air/fuel ratio to a value of 0.95.

To determine the time required for sulfur removal, a specimen of the sulfur traps in Example 1 was loaded with sulfur, as described above, in a lean operated petrol engine at 400° C. for a period of 5 hours, using a fuel with a sulfur content of 400 ppm by wt. The volume of the sulfur trap was 0.8 liters. Then the exhaust gas temperature was increased to a temperature of 640° C. with a normalized air/fuel ratio of 1.05. After reaching this temperature, the normalized air/fuel ratio was towered to a value of 0.98 and then, in a second pass, lowered to a value of 0.95. The volume flow of the exhaust gas was about 102,000 Nl/h. The sulfur removal characteristics are shown in FIGS. 14 and 15 as a function of time.

If sulfur removal is performed with a normalized air/fuel ratio of 0.95 (FIG. 15), then the sulfur trap releases a large part of the sulfates initially within a short time in the form of sulfur dioxide. However, a considerable part of the stored sulfur is emitted in the form of hydrogen sulfide over a longer period of time. This slow release of hydrogen sulfide is responsible for the fact that a relatively long time is required for sulfur removal.

On the other hand, if sulfur removal is performed with a normalized air/fuel ratio of 0.98 (FIG. 14), then the sulfur is released exclusively in the form of sulfur dioxide. Although release of the sulfur dioxide then takes longer than with $\lambda=0.95$, the lack of a prolonged release of hydrogen sulfide results in the duration of sulfur removal with $\lambda=0.98$ being much shorter overall.

Figure 16:
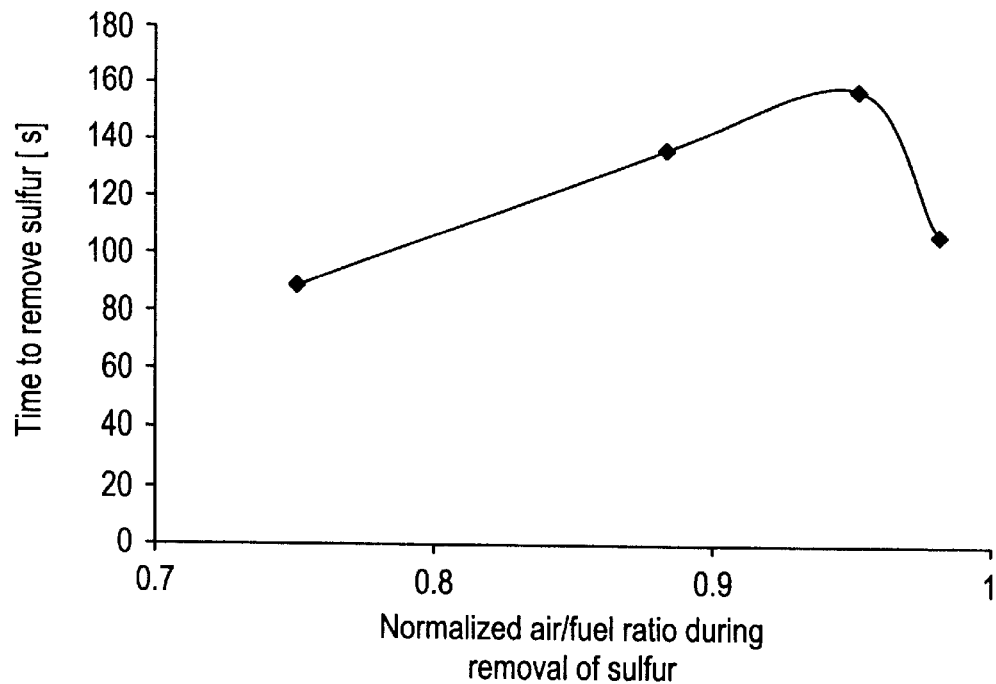
FIG. 16 is a graph of the duration of sulfur removal as a function of the normalized air/fuel ratio.

FIG. 16 shows the duration of sulfur removal with four different normalized air/fuel ratios. While a normalized air/fuel ratio of 0.98 is a beneficial value with regard to the duration of sulfur removal and the suppression of hydrogen sulfide, it is possible to reduce the duration of sulfur removal by lowering the normalized air/fuel ratio even further. Thus, with a normalized air/fuel ratio of 0.75, more rapid sulfur removal is achieved than with a normalized air/fuel ratio of 0.98. However, the released sulfur is converted almost quantitatively into hydrogen sulfide and in this case has to be oxidized again to give sulfur dioxide, using separate steps.

Figure 17:
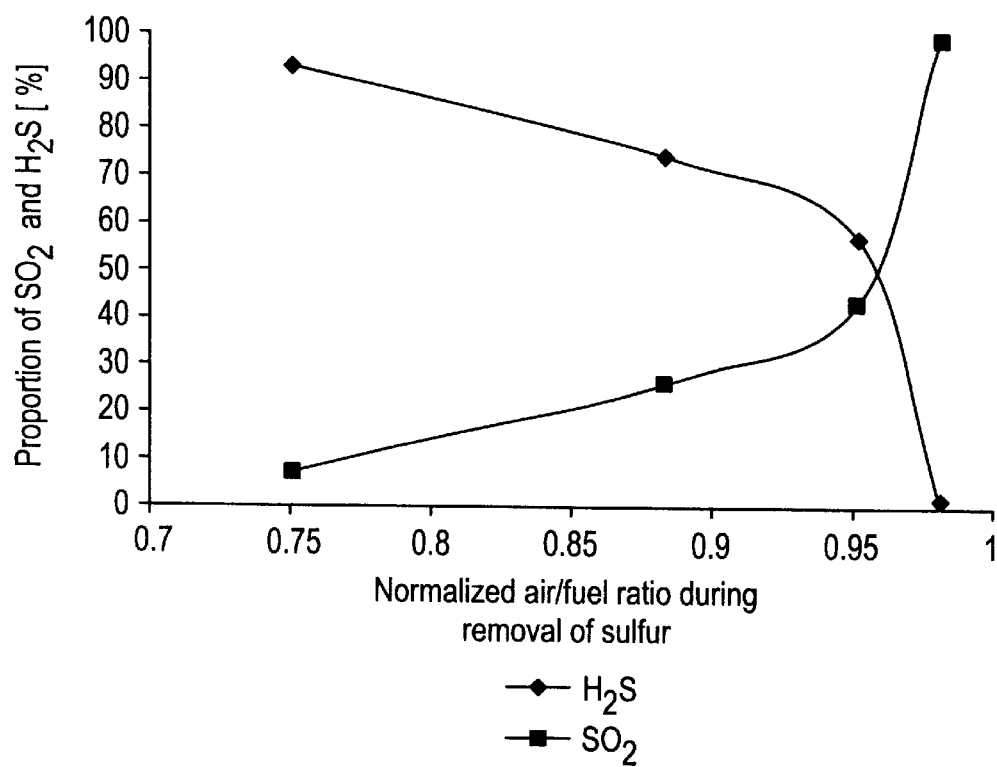
FIG. 17 is a plot of the proportion of sulfur dioxide and hydrogen sulfide, as a percentage, in the exhaust gas just downstream of the sulfur trap with different normalized air/fuel ratios during sulfur removal.

FIG. 17 shows the percentages of hydrogen sulfide and sulfur dioxide in the exhaust gas downstream of the sulfur trap as a function of the normalized air/fuel ratio used during sulfur removal. This ratio depends greatly on the volume of the sulfur trap used and thus on the residence time of the released sulfur dioxide in the sulfur trap. The longer the residence time in the region of the sulfur trap, the more hydrogen sulfide is produced.

Figure 18:
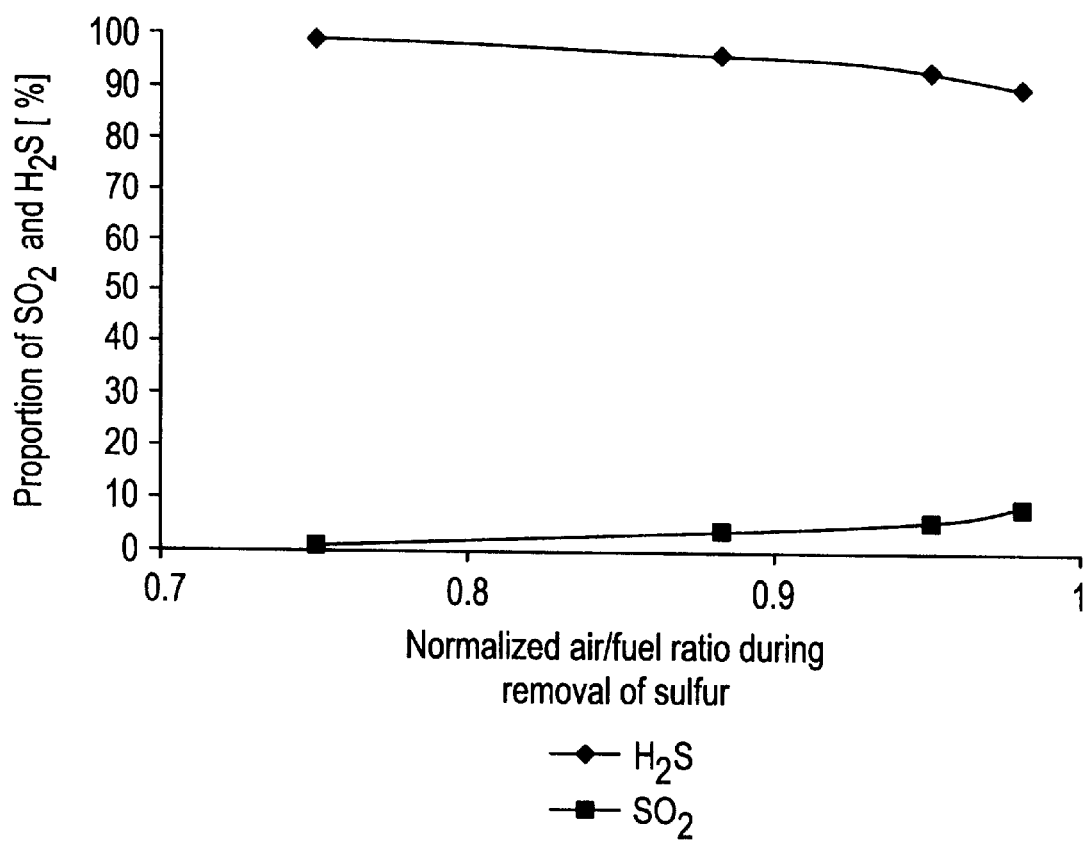
FIG. 18 is a plot of the proportion of sulfur dioxide and hydrogen sulfide, as a percentage, in the exhaust gas just downstream of the sulfur trap with different normalized air/fuel ratios during sulfur removal.

This behavior is also exhibited by the downstream storage catalyst which again reduces the sulfur dioxide flowing through it to hydrogen sulfide under the exhaust gas reducing conditions during sulfur removal. FIG. 18 shows the percentages measured of sulfur dioxide and hydrogen sulfide in the exhaust gas just downstream of the storage catalyst, as a function of the normalized air/fuel ratio during sulfur removal. It can be seen that even when using a normalized air/fuel ratio of 0.98 during sulfur removal, the greater part of the sulfur leaves the storage catalyst in the form of hydrogen sulfide.

The emission of hydrogen sulfide is therefore avoided only with difficulty when using a large volume catalyst system and the long residence times of the released sulfur components in the catalyst system resulting therefrom.

Figure 19:
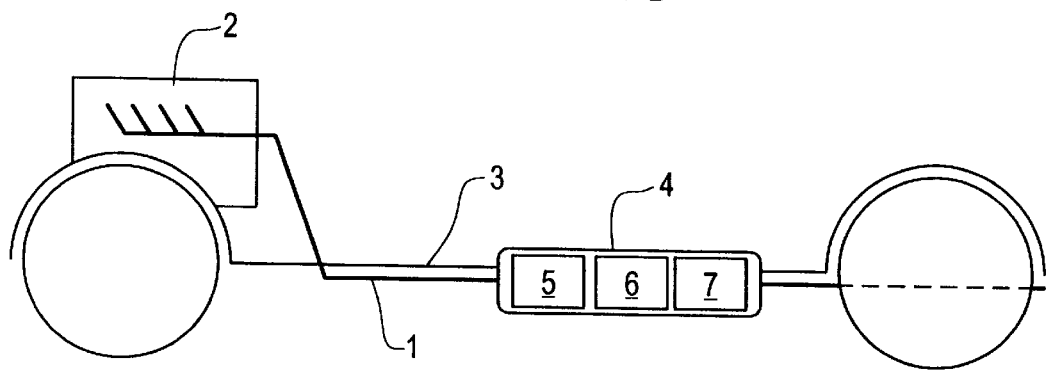
FIG. 19 is a schematic diagram of an exhaust gas treatment unit with downstream catalyst for suppressing the emission of hydrogen sulfide.

In another variant of the invention, therefore, the emission of hydrogen sulfide is avoided by using a catalyst located just downstream of the storage catalyst, which absorbs hydrogen sulfide. Catalysts for this purpose are known and they temporarily store the hydrogen sulfide as sulfide with the aid of oxides of manganese, nickel, zinc or iron, under reducing conditions, and release it again as sulfur dioxide under stoichiometric or slightly lean-mix conditions. The layout for an exhaust gas unit of this type is shown in FIG. 19. Another catalyst (7) is connected downstream of the storage catalyst and accommodated together with this in a converter housing. Catalyst (7) suppresses the emission of hydrogen sulfide in the way described above.

Figure 20:
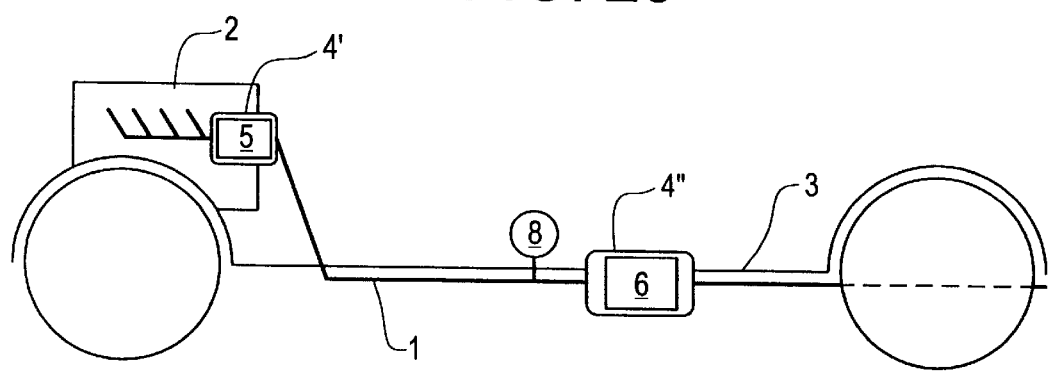
FIG. 20 is a schematic diagram of an exhaust gas treatment unit with secondary air injection just upstream of the storage catalyst during sulfur removal from the sulfur trap, to suppress the emission of hydrogen sulfide.

Another possibility of suppressing hydrogen sulfide comprises decreasing the concentration of reducing components, especially hydrogen, by adding secondary air just upstream of the storage catalyst and thus suppressing the formation of hydrogen sulfide. The exhaust gas conditions over the storage catalyst, however, must retain a net reducing effect in order to prevent storage of the released sulfur dioxide on the storage catalyst. This type of exhaust gas unit is shown in FIG. 20. The sulfur trap (5) is located just downstream of the engine, separately from the storage catalyst. Secondary air is injected into the exhaust gas stream just upstream of the storage catalyst, using an air pump (8). This configuration for the exhaust gas unit is used in particular when the normalized air/fuel ratio in the exhaust gas is lowered to a value between 0.6 and 0.8 to remove sulfur from the sulfur trap and optionally from the storage catalyst.

Figure 21:
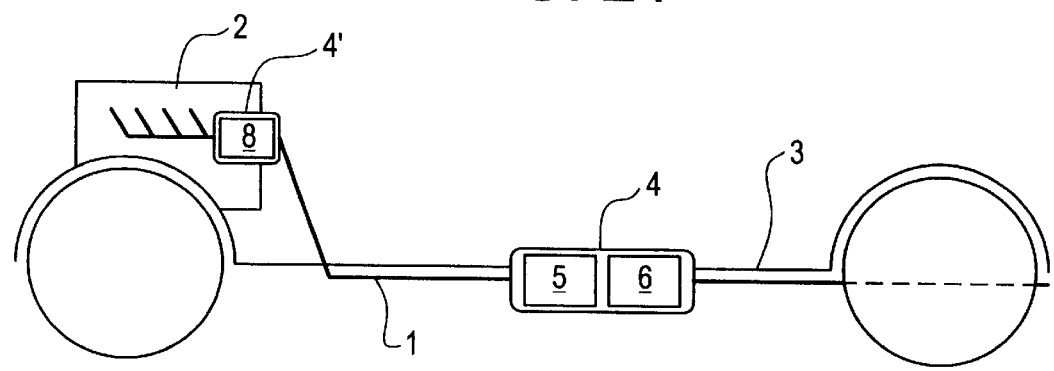
FIG. 21 is a schematic diagram of an exhaust gas treatment unit with a precatalyst close to the engine in order to oxidize sulfur oxides.

FIG. 21 shows an exhaust gas unit in which the sulfur trap 5 is not provided with catalytically active elements to oxidize the sulfur oxides. Oxidation of the sulfur oxides in this case takes place on catalyst 8 which is close to the engine.

Further variations and modifications will be apparent to those skilled in the art from the foregoing and are intended to be encompassed by the claims appended hereto.

German priority application 198 13 654.4 is relied on and incorporated herein by reference.

We claim:

1. A process for operating an exhaust gas treatment unit for an internal combustion engine which is operated during most of the operating period with lean air/fuel ratios, wherein the exhaust gas treatment unit contains:

a nitrogen oxides storage catalyst with an activity window $\Delta T_{NOX}$ between the temperatures $T_{K,1}$ and $T_{K,2}$ for the storage of nitrogen oxides at normalized air/fuel ratios greater than 1 and release of the nitrogen oxides at normalized air/fuel ratios less than or equal to 1 and a sulfur desorption temperature $T_{K,DeSOx}$, above which the sulfates stored on the catalyst are decomposed at normalized air/fuel ratios less than or equal to 1 and a sulfur trap which is upstream of the nitrogen oxides storage catalyst and located at a distance from this, with a sulfur desorption temperature $T_{S,DeSOx}$ above which sulfates stored on the sulfur trap are decomposed at normalized air/fuel ratios less than or equal to 1, wherein there is a temperature difference $\Delta T_{S,K}$ between the sulfur trap and the storage catalyst, between the exhaust gas temperature $T_S$ just upstream of the sulfur trap and the exhaust gas temperature $T_K$ just upstream of the storage catalyst, and the process comprises:

a) storing of the nitrogen oxides contained in the exhaust gas on the nitrogen oxides storage catalyst and storing the sulfur oxides on the sulfur trap at normalized air/fuel ratios greater than 1 and with exhaust gas temperatures $T_K$ within the activity window $\Delta T_{NOX}$, wherein at the same time the exhaust gas temperature $T_S$ is less than the sulfur desorption temperature $T_{S,DeSOx}$, and cyclically lowering the normalized air/fuel ratio in the exhaust gas to less than 1 to release the stored nitrogen oxides; and b) removing sulfur from the sulfur trap after each predetermined number $N_1$ of nitrogen oxides storage cycles by raising the exhaust gas temperature $T_S$ above the sulfur desorption temperature $T_{S,DeSOx}$ of the sulfur trap and lowering the normalized air/fuel ratio in the exhaust gas to below 1.

2. The process according to claim 1, further comprising cyclically repeating a) and b).

3. The process according to claim 1, further comprising controlling the relationship between the sulfur desorption temperature $T_{S,DeSOx}$, the temperature difference $\Delta T_{S,K}$ between the exhaust gas temperature $T_S$ just upstream of the sulfur trap and $T_K$ just upstream of the storage catalyst and the upper limiting temperature $T_{K,2}$ for the activity window of the storage catalyst by the equation:

$$T_{K,2}+\Delta T_{S,K}>T_{S,DeSOx}.$$

4. A process according to claim 2, further comprising varying the number $N_1$ of nitrogen oxides storage cycles between two sulfur removal procedures for the sulfur trap from 10 to 100,000.

5. A process according to claim 1, further comprising varying the number $N_1$ of nitrogen oxides storage cycles between two sulfur removal procedures for the sulfur trap from 10 to 100,000.

6. The process according to claim 4, further comprising lowering the normalized air/fuel ratio in the exhaust gas to a value between 0.6 and 0.9 to release the nitrogen oxides from the storage catalyst.

7. The process according to claim 5, further comprising lowering the normalized air/fuel ratio in the exhaust gas to a value between 0.6 and 0.9 to release the nitrogen oxides from the storage catalyst.

8. The process according to claim 6, further comprising removing sulfur from the storage catalyst after each predetermined number $N_2$ of nitrogen oxides storage cycles, wherein, to remove sulfur, the exhaust gas temperature $T_K$ just upstream of the storage catalyst is raised to above its sulfur desorption temperature $T_{K,DeSOx}$ and the normalized air/fuel ratio is lowered to less than 1.

9. The process according to claim 8, wherein the number $N_2$ of nitrogen oxides storage cycles between two sulfur removal procedures for the storage catalyst is set to be larger than $N_1$ by a factor of 2 to 100.

10. A process according to claim 6, further comprising removing sulfur from the sulfur trap and optionally from the storage catalyst, by lowering the normalized air/fuel ratio in the exhaust gas to a value between 0.96 and 1.01.

11. The process according to claim 10, wherein the value is 0.97 and 1.0.

12. The process according to claim 6, further comprising removing sulfur from the sulfur trap and optionally from the storage catalyst, by lowering the normalized air/fuel ratio in the exhaust gas to a value between 0.6 and 0.8.

13. The process according to claim 12, further comprising adding secondary air just upstream of the nitrogen oxides storage catalyst during sulfur removal from the sulfur trap in order to raise the normalized air/fuel ratio in the storage catalyst to a value between 0.98 and 1.01.

14. The process according to claim 1, wherein the nitrogen oxides storage catalyst contains at least one nitrogen oxides storage component selected from the group consisting of compounds of lithium, sodium, potassium, cesium, rubidium, calcium, strontium, barium, lanthanum and yttrium and contains at least one metal selected from the group consisting of platinum, palladium, rhodium, iridium and mixtures as a catalytically active component.

15. The process according to claim 1, wherein the sulfur trap contains at least one sulfur oxide storage component selected from the group consisting of compounds of the alkaline earth metals magnesium, calcium, strontium and barium or of lanthanum.

16. The process according to claim 1, wherein the sulfur oxide storage component is a Mg/Al hydrotalcite.

17. The process according to claim 16, wherein the Mg/Al hydrotalcite is doped with at least one element selected from the group consisting of the alkaline earth metals calcium, strontium, barium and the rare earth oxides, in an amount of 0.5 to 40 wt. %, with respect to the total weight.

18. The process according to claim 17, further comprising calcining the Mg/Al hydrotalcite at 400 to 600° C. for a period of 1 to 10 hours prior to use as a sulfur oxide storage component.

19. The process according to claim 15, wherein the sulfur trap also contains at least one metal selected from the group consisting of platinum, palladium, rhodium, iridium and mixtures thereof.

20. The process according to claim 1, wherein the sulfur trap also contains nitrogen oxide storage components.

21. The process according to claim 1, wherein the sulfur trap is located directly upstream of the storage catalyst and in a common converter housing.

22. The process according to claim 1, wherein a conventional exhaust gas catalyst, which also contains oxides of manganese, nickel, zinc or iron as storage materials for hydrogen sulfide, is located downstream of the nitrogen oxides storage catalyst.

23. The process according to claim 21, wherein the sulfur trap does not contain any catalytically active components for oxidizing sulfur oxides and that an oxidizing or three-way catalyst is located directly downstream of the engine exhaust point for oxidation of the sulfur oxides.

24. The process according to claim 1, wherein the sulfur trap is displaced from the storage catalyst and is located in a separate housing.

25. The process according to claim 24, wherein the sulfur trap is located just downstream of the engine outlet.

* * * * *